United States Patent
Furuhashi et al.

(10) Patent No.: US 7,545,746 B2
(45) Date of Patent: Jun. 9, 2009

(54) COMPUTER SYSTEM FOR CONTROLLING ROUTED DATA AMOUNT

(75) Inventors: Ryoji Furuhashi, Yokohama (JP); Yuichi Taguchi, Sagamihara (JP); Naoko Maruyama, Kawasaki (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 943 days.

(21) Appl. No.: 10/975,821

(22) Filed: Oct. 29, 2004

(65) Prior Publication Data

US 2006/0039351 A1 Feb. 23, 2006

(30) Foreign Application Priority Data

Aug. 23, 2004 (JP) ............................. 2004-242543

(51) Int. Cl.
H04L 12/26 (2006.01)

(52) U.S. Cl. .................. 370/234; 370/252; 370/428

(58) Field of Classification Search ................. 370/351, 370/230, 230.1, 231, 232, 233, 234, 235, 370/252, 253, 401, 412, 413, 414, 415, 416, 370/417, 418, 428, 429

See application file for complete search history.

(56) References Cited

U.S. PATENT DOCUMENTS

| 6,064,671 | A | * | 5/2000 | Killian ....................... 370/389 |
| 2001/0028633 | A1 | * | 10/2001 | Shimada et al. ............. 370/252 |
| 2002/0178336 | A1 | * | 11/2002 | Fujimoto et al. ............ 711/165 |
| 2005/0004931 | A1 | * | 1/2005 | Kihara et al. ............... 707/102 |

* cited by examiner

Primary Examiner—Ricky Ngo
Assistant Examiner—Wei-Po Kao
(74) Attorney, Agent, or Firm—Antonelli, Terry, Stout & Kraus, LLP.

(57) ABSTRACT

A computer system having a work computer, first storage systems, and second storage systems also has a network, a network routing device, and a management computer. Upon receipt of the update data from the work computer, the first storage system stores the update data in a first storage volume and stores the update data in a second storage volume until the update data is transferred to the second storage system. The management computer obtains an used capacity of the second storage volume of each of the first storage systems and controls the routing of the data by the network routing device based on the obtained used capacity to prevent the cache of each of the storage systems from being overflown.

18 Claims, 17 Drawing Sheets

DIFFERENTIAL DATA AMOUNT TABLE 1042

| SYSTEM ID | DIFFERENTIAL DATA AREA VOLUME | USED CAPACITY | INCREMENT OR DECREMENT |
|---|---|---|---|
| PRIMARY STORAGE SYSTEM 4000 | T1 | v1 | d1 |
| PRIMARY STORAGE SYSTEM 4500 | T2 | v2 | d2 |

FIG.7A

BANDWIDTH TABLE 1044

| SYSTEM ID | BANDWIDTH RATIO |
|---|---|
| PRIMARY STORAGE SYSTEM 4000 | bw1 |
| PRIMARY STORAGE SYSTEM 4500 | bw2 |

FIG.7B

BANDWIDTH TABLE 6061

| SYSTEM ID | BANDWIDTH RATIO | CUE ID |
|---|---|---|
| PRIMARY STORAGE SYSTEM 4000 | bw1 | CUE A |
| PRIMARY STORAGE SYSTEM 4500 | bw2 | CUE B |

FIG.8

COMPUTER SYSTEM FOR CONTROLLING ROUTED DATA AMOUNT

CLAIM OF PRIORITY

The present application claims priority from Japanese application P2004-242543 filed on Aug. 23, 2004, the content of which is hereby incorporated by reference into this application.

BACKGROUND

This invention relates to a remote copy technology in a storage system, and more particularly to a technology which shares a network used for remote copy among plural storage systems.

In recent years, computer systems have been used extensively by enterprises for business purposes and data stored in a storage system has been gaining increasing importance. For the storage system, a technology which renders a storage area redundant, such as RAID, has been used to protect data to be stored.

Even though the storage area in the storage system is rendered redundant, the whole storage system may be lost in the event of a large-scale disaster. Accordingly, the storage system uses a remote copy technology to protect data even in the event of a large-scale disaster. The remote copy technology renders the whole storage system redundant, disposes the redundant storage system at a remote place, and copies data in the storage system (backup storage system) at the remote place. Upon receipt of a request to write data from a host computer, a primary storage system stores the data write request therein and then copies the data in the backup storage system via a network.

The remote copy technology uses a synchronous method or an asynchronous method. In the synchronous method, when the copying of data in the backup storage system is completed, the primary storage system notifies the host computer that the writing of the data has been completed. In the asynchronous method, the primary storage system notifies the host computer that the writing of the data has been completed without awaiting the completion of the copying of the data in the backup storage system.

A description will be given hereinbelow to the operation of the primary storage system using the asynchronous method. Upon receipt of a data write request from the host computer, the primary storage system temporarily stores the data in its cache. Then, the primary storage system notifies the host computer that the writing of the data has been completed and transmits the cached data to the backup storage system via the network.

In the remote copy using the asynchronous method, when the primary storage system receives a request to write data in an amount exceeding an transmission capacity the network used for the remote copy, the data overflows the cache of the primary storage system to be lost. To prevent such a data loss, the primary storage system refuses a data write request from the host computer when the cache is likely to be overflown.

A consideration will be given hereinbelow to the case where plural host computers share the primary storage system. In this case, when the primary storage system receives a request to write a large amount of data from a given one of the host computers, it refuses data write requests from all the host computers so that the usability of the system lowers.

To prevent such a problem, a technology has been known which sets a threshold value for the capacity of the cache usable for each of the host computers which write data in the primary storage system (see, e.g., JP 2002-334049 A). The primary storage system monitors the used capacity of the cache on a per host-computer basis and limits data write requests from the host computers based on the threshold values. This protects the cache of the primary storage system from being overflown and prevents a reduction in the usability of the system.

SUMMARY

In the case where plural host computers share a primary storage system, the above-mentioned prior art technology causes the storage system to limit the writing of data from the host computers and thereby prevents the cache from being overflown. However, no consideration has been given to the case where plural primary storage systems share a network used for remote copy.

It is therefore an object of this invention to prevent, in such a case, the cache of a given one of the primary storage systems from being overflown irrespective of a sufficient free capacity in the cache of another primary storage system and thereby improve the usability of all the systems.

There may also be considered the case where plural storage systems share a network used for remote copy and systems using the primary storage systems have different degrees of importance. It is another object of this invention to prevent, in such a case, the cache of each of the storage systems from being overflown by causing the storage system used by the system with a higher degree of importance to preferentially use the network and thereby improve the usability of the system with a higher degree of importance.

According to an embodiment of this invention, there is provided a computer system including: a work computer; a plurality of first storage systems each of which stores therein data used by the work computer; a plurality of second storage systems each of which stores therein a copy of the data stored in one of the first storage systems; a network used for data transfer from one of the first storage systems to one of the second storage systems; a network routing device which routes data between the network and the first storage system and between the network and the second storage system; and a management computer connected to the first storage systems and to the network routing device to control at least one of the network routing device and the first storage systems. Each of the first storage systems includes: a first storage area which stores therein update data transmitted from the work computer; a second storage area which stores therein the update data until the update data is transferred to the second storage system; and a controller which controls inputting and outputting of the data to and from the first and second storage areas, receives the update data from the work computer, stores the update data in the first storage area, and stores the update data in the second storage area until the update data is transferred to the second storage system; and the management computer obtains an used capacity of the second storage area of each of the first storage systems and controls routing of the data by the router based on the obtained used capacity.

According to the embodiment of this invention, when plural primary storage systems share a network used for remote copy, it becomes possible to prevent the cache of a specific one of the primary storage systems from being overflown irrespective of a sufficient free capacity in the cache of another primary storage system.

BRIEF DESCRIPTION OF THE DRAWINGS

The present invention can be appreciated by the description which follows in conjunction with the following figures, wherein:

FIG. 7A is a structural diagram of a differential data amount table stored in the management server according to the first embodiment.

FIG. 7B is a structural diagram of a bandwidth table stored in the management server according to the first embodiment.

FIG. 8 is a structural diagram of a bandwidth table stored in the router according to the first embodiment.

DETAILED DESCRIPTION OF THE PREFERRED EMBODIMENTS

Figure 1:
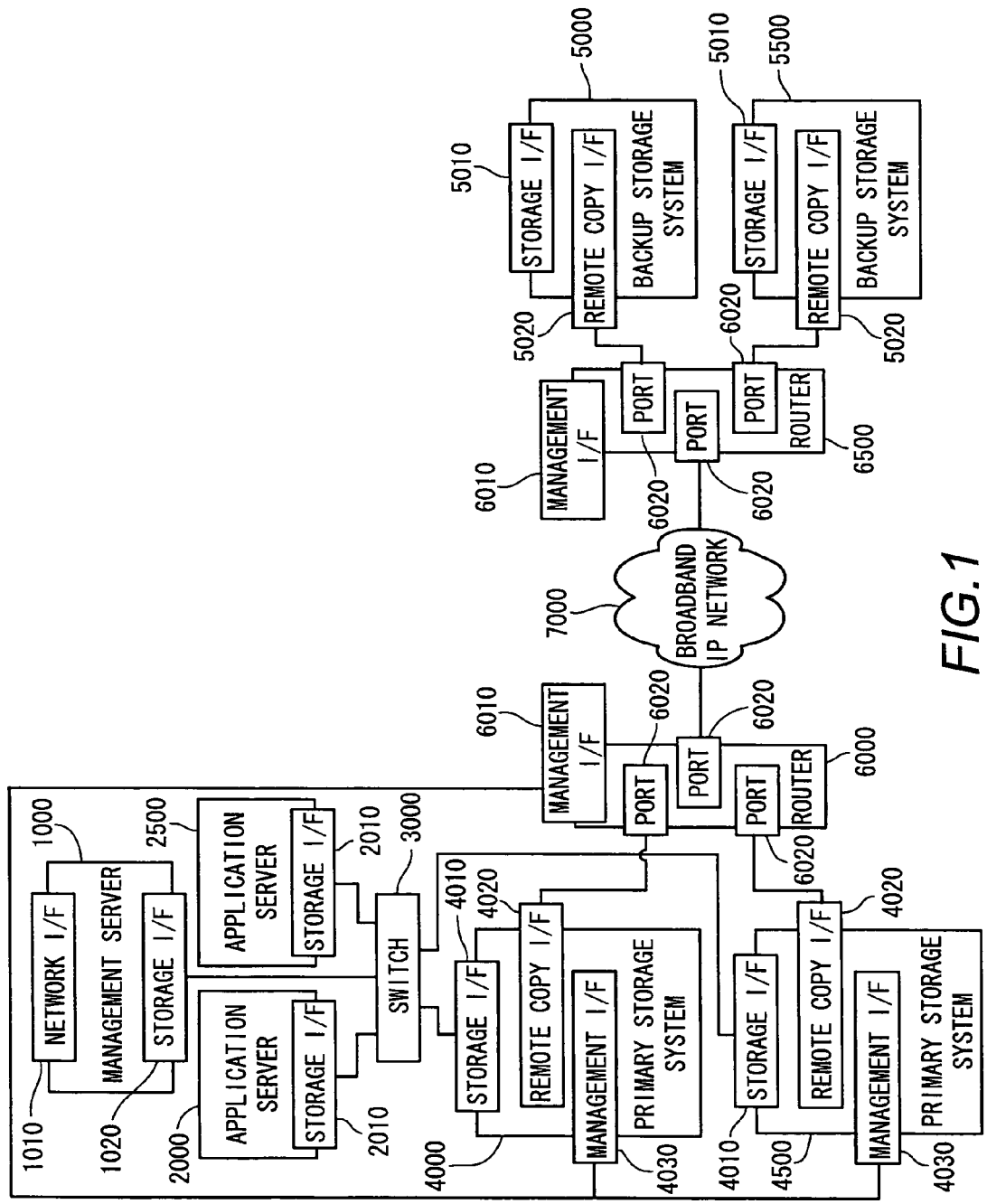
FIG. 1 is a block diagram of a computer system according to a first embodiment of this invention.

Referring to the drawings, the individual embodiments of this invention will be described hereinbelow.

First Embodiment

FIG. 1 is a block diagram of a computer system according to. a first embodiment of this invention.

The computer system includes a management server 1000, application servers 2000 and 2500, a switch 3000, primary storage systems 40000 and 4500, backup storage systems 5000 and 5500, routers 6000 and 6500, and a broadband IP network 7000.

The management server 1000 includes a network I/F 1010 and a storage I/F 1020. The network I/F 1010 is connected to the management I/F 4030 of each of the primary storage systems 4000 and 4500. The storage I/F 1020 is connected to the storage I/F 4010 of each of the primary storage systems 4000 and 4500 via the switch 3000. The network I/F 1010 is further connected to the management I/F 6010 of the router 6000.

The application server 2000 is a computer which stores data to be used in the primary storage system 4000 and executes an application. The application server 2500 is a computer which stores data to be used in the primary storage system 4500 and executes an application program. Each of the application servers 2000 and 2500 includes a storage I/F 2010. The storage I/F 2010 is connected to the storage I/F 4010 of each of the primary storage systems 4000 and 4500 via the switch 3000.

The primary storage system 4000 is an external storage system which stores therein data used by the application server 2000. The primary storage system 4500 is an external storage system which stores therein data used by the application server 2500.

Each of the primary storage systems 4000 and 4500 includes a storage I/F 4010, a remote copy I/F 4020, and a management I/F 4030. The remote copy I/F 4020 is connected to one of the ports 6020 of the router 6000.

The backup storage system 5000 is an external storage system for storing therein the same data as stored in the primary storage system 4000 and retaining redundancy. The backup storage system 5500 is an external storage system for storing therein the same data as stored in the primary storage system 4500 and retaining redundancy.

Each of the primary storage systems 5000 and 5500 includes a storage I/F 5010, a remote copy I/F 5020, and a management I/F 5030. The remote copy I/F 5020 is connected to one of the ports 6020 of the router 6500.

The primary storage system 4000 performs remote copy with respect to the backup storage system 5000 via the router 6000, the broadband IP network 7000, and the router 6500. Likewise, the primary storage system 4500 performs remote copy with respect to the backup storage system 5500 via the router 6000, the broadband IP network 7000, and the router 6500.

The routers 6000 and 6500 are network devices which route the remote copy from the primary storage systems 4000 and 4500 to the backup storage systems 5000 and 5500.

Although the two application servers 2000 and 2500, the two primary storage systems 4000 and 4500, and the two backup storage systems 5000 and 5500 are shown in the drawing, it is also possible to provide three or more application servers, three or more primary storage systems, and three or more backup systems.

Figure 2:
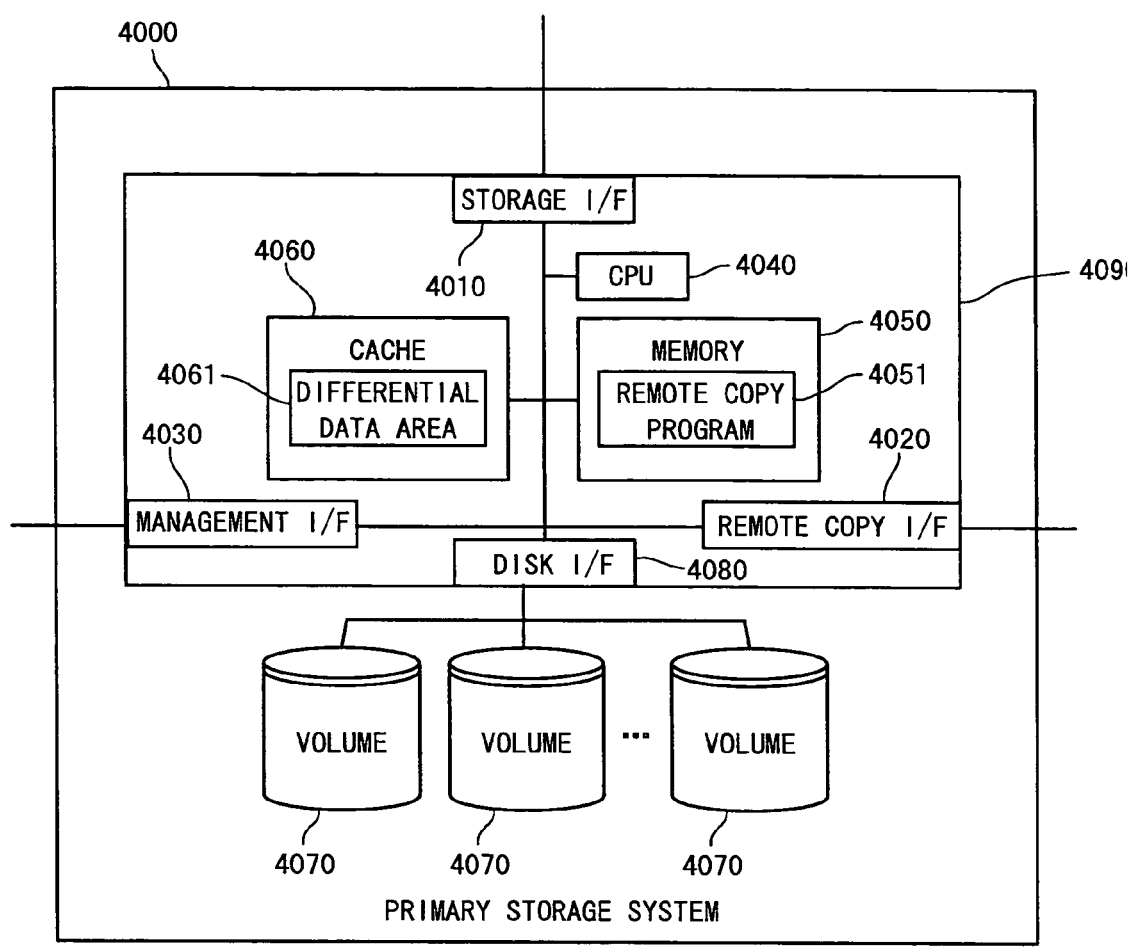
FIG. 2 is a block diagram of a primary storage system according to the first embodiment.

FIG. 2 is a block diagram of the primary storage system 4000 according to the first embodiment.

The primary storage system 4000 includes a controller 4090 and a volume 4070.

The controller 4090 controls the inputting and outputting of data to and from the volume 4070. The controller 4090 includes a storage I/F 4010, a remote copy I/F 4020, a management I/F 4030, a CPU 4040, a memory 4050, a cache 4060, and a disk I/F 4080. The individual components of the controller 4090 are connected to be communicable with one another.

The memory 4050 stores therein a remote copy program 4051 and a control program (not shown). The CPU 4040 executes remote copy by loading and executing the remote copy program 4051. The CPU 4040 also controls the whole primary storage system 4000 by loading and executing the control program.

The cache 4060 is a high-speed memory which stores therein read data and write data. The primary storage system 4000 implements high I/O processing performance by temporarily storing data in the cache 4060. The cache 4060 is provided with a differential data area 4061. In the differential data area 4061, data transmitted and received between the storage I/F 4010 and the remote copy I/F 4020 is stored temporarily. In the area of the cache 4060 other than the differential data area 4061, data transmitted and received between the storage I/F 4010 and the disk I/F 4080 is stored temporarily.

The storage I/F 4010 is an interface which provides connection between the management server 1000 and the application server 2000 and transmits and receives data and a control signal based on, e.g., the Fibre channel Protocol.

The remote copy I/F 4020 is an interface connected to the router 6000 and transmits and receives data and a control signal based on, e.g., the Fibre channel Protocol.

The management I/F 4030 is an interface connected to the management server 1000 and transmits and receives data and a control signal based on, e.g., the TCP/IP protocol.

The disk I/F 4080 is an interface with the volume 4070 and transmits and receives data and a control signal based on, e.g., the Fibre channel Protocol.

The volume 4070 stores therein data used by the application server 2000. The volume 4070 may also be a local area of a single disk drive. The volume 4070 need not be physically composed of one unit. The volume 4070 may be, e.g., a set of storage areas distributed among plural disk drives. The volume 4070 may also be a structure with redundancy such as a mirror structure or a RAID structure with parity data appended thereto.

The primary storage system 4500 also has the same structure as the primary storage system 4000.

Figure 3:
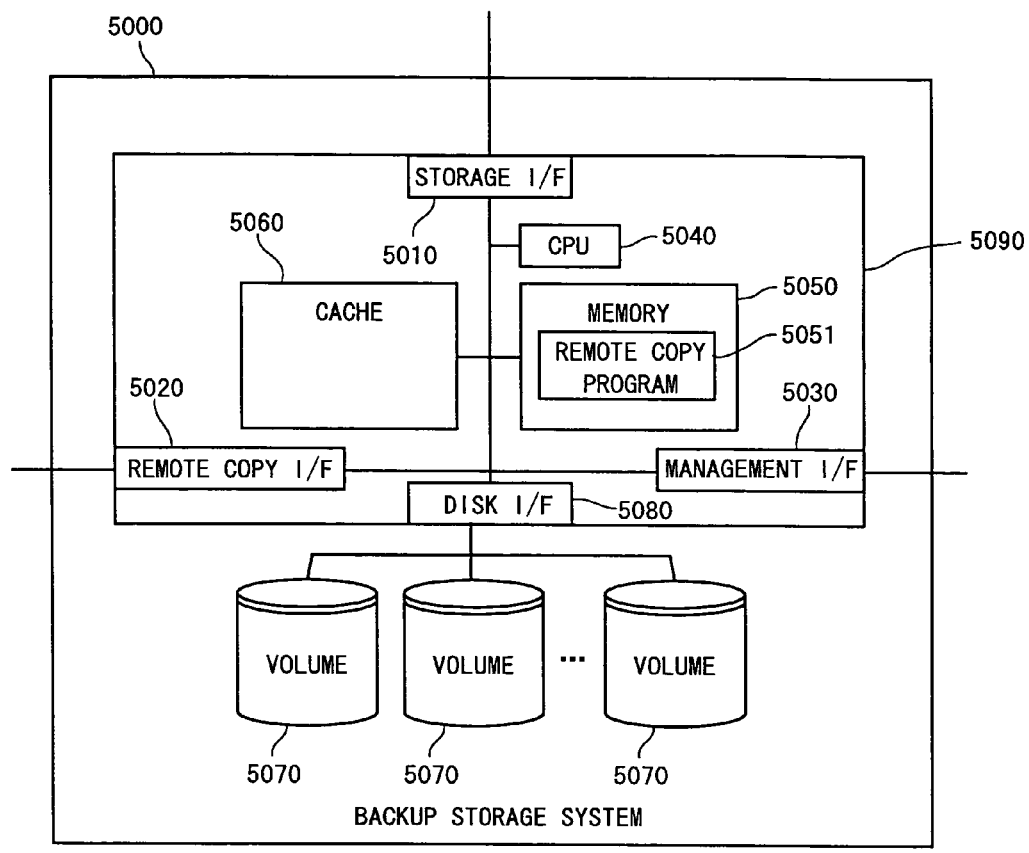
FIG. 3 is a block diagram of a backup storage system according to the first embodiment.

FIG. 3 is a block diagram of the backup storage system 5000 according to the first embodiment.

The backup storage system 5000 includes a controller 5090 and a volume 5070.

The controller 5090 controls the inputting and outputting of data to and from the volume 5070. The controller 5090 includes a storage I/F 5010, a remote copy I/F 5020, a management I/F 5030, a CPU 5040, a memory 5050, a cache 5060, and a disk I/F 5080. The individual components of the controller 5090 are connected to be communicable with each other.

The memory 5050 stores therein a remote copy program 5051 and a control program not shown. The CPU 5040 executes remote copy by loading and executing the remote copy program 5051. The CPU 5040 also controls the whole backup storage system 5000 by loading and executing the control program.

The cache 5060 temporarily stores therein data transmitted and received between the remote copy I/F 5020 and the disk I/F 5080.

The storage I/F 5010 is an interface connected to the same server, which is not shown, as the management server 1000 and to the same server, which is not shown, as the application servers 2000 and 2500 and transmits and receives data and a control signal based on, e.g., the Fibre channel Protocol.

The remote copy I/F 5020 is an interface connected to the router 6500 and transmits and receives data and a control signal based on, e.g., the Fibre channel Protocol.

The management I/F 5030 is an interface connected to the same server, which is not shown, as the management server 1000 and transmits and receives data and a control signal based on, e.g., the TCP/IP protocol.

The disk I/F 5080 is an interface with the volume 5070 and transmits and receives data and a control signal based on, e.g., the Fibre channel Protocol.

The volume 5070 stores therein the same data as that of the volume 4070 of the primary storage system 4000. The volume 5070 may also be a part of a single disk drive. The volume 5070 need not be physically composed of one unit or a set of storage areas distributed among plural disk drives. The volume 5070 may also be a structure with redundancy such as a mirror structure or a RAID structure with parity data appended thereto.

The primary storage system 5500 also has the same structure as the primary storage system 5000.

Figure 4:
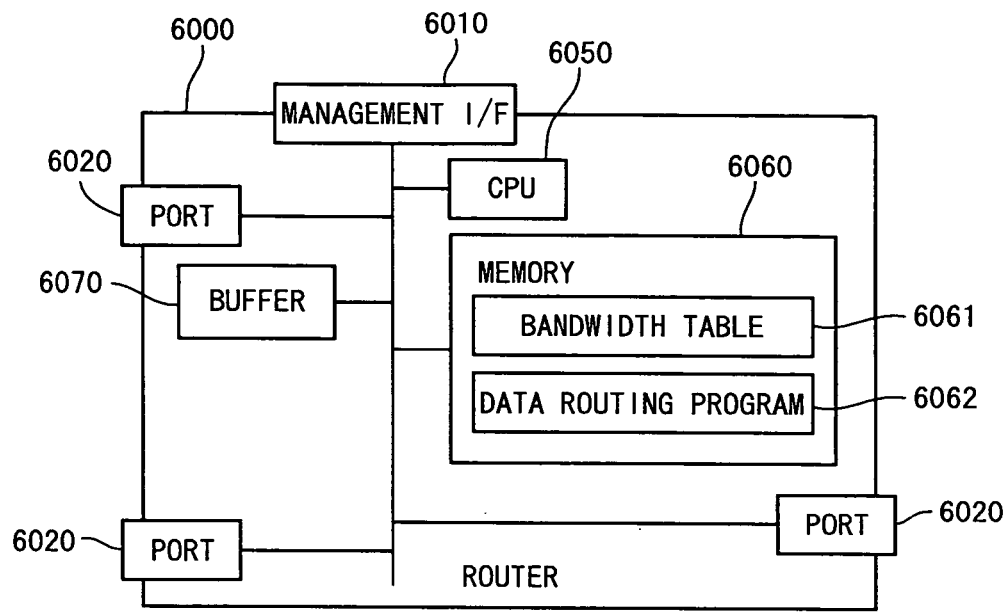
FIG. 4 is a block diagram of a router according to the first embodiment.

FIG. 4 is a block diagram of the backup storage system 6000 according to the first embodiment.

The router 6000 includes the management I/F 6010, the plural ports 6020, a CPU 6050, a memory 6060, and a buffer 6070. The individual components of the router 6000 are connected to be communicable with each other.

The memory 6060 stores therein a bandwidth table 6061 and a data routing program 6062. As will be described later with reference to FIG. 8, the bandwidth table 6061 shows a bandwidth ratio for each of the primary storage systems 4000. The CPU 6050 routes data transmitted from the primary storage system 4000 to the backup storage system 5000 by loading and executing the data routing program 6062.

The management I/F 6010 is an interface connected to the management server 1000 and transmits and receives data and a control signal based on, e.g., the TCP/IP Protocol. The ports 6020 are interfaces connected to the primary storage systems 4000 and 4500 and to the broadband IP network 7000 and transmits and receives data and a control signal based on, e.g., the Fibre channel Protocol.

The buffer 6070 temporarily stores therein data received from the primary storage systems 4000 and 4500 until it is transmitted to the broadband IP network 7000.

The router 6500 also has the same structure as the router 6000.

Figure 5:
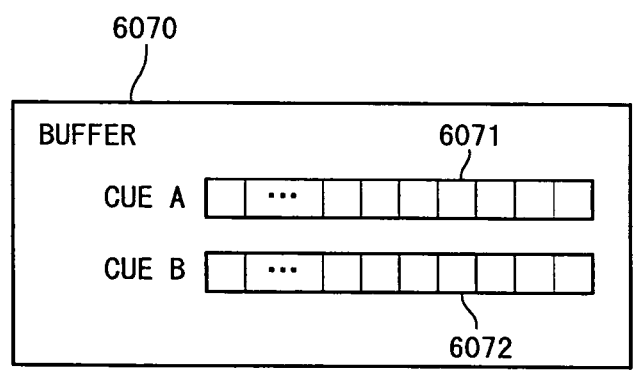
FIG. 5 is a structural diagram of a buffer in the router according to the first embodiment.

FIG. 5 is a structural diagram of the buffer 6070 in the router 6000 according to the first embodiment.

The buffer 6070 includes a cue A 6071 and a cue B 6072. The cue A is an area which stores therein data received from the primary storage system 4000. The cue B is an area which stores therein data received from the primary storage system 4500. Although the buffer 6070 includes the two cues 6071 and 6072 as shown in the drawing, the buffer 6070 may also include a number of cues.

Figure 6:
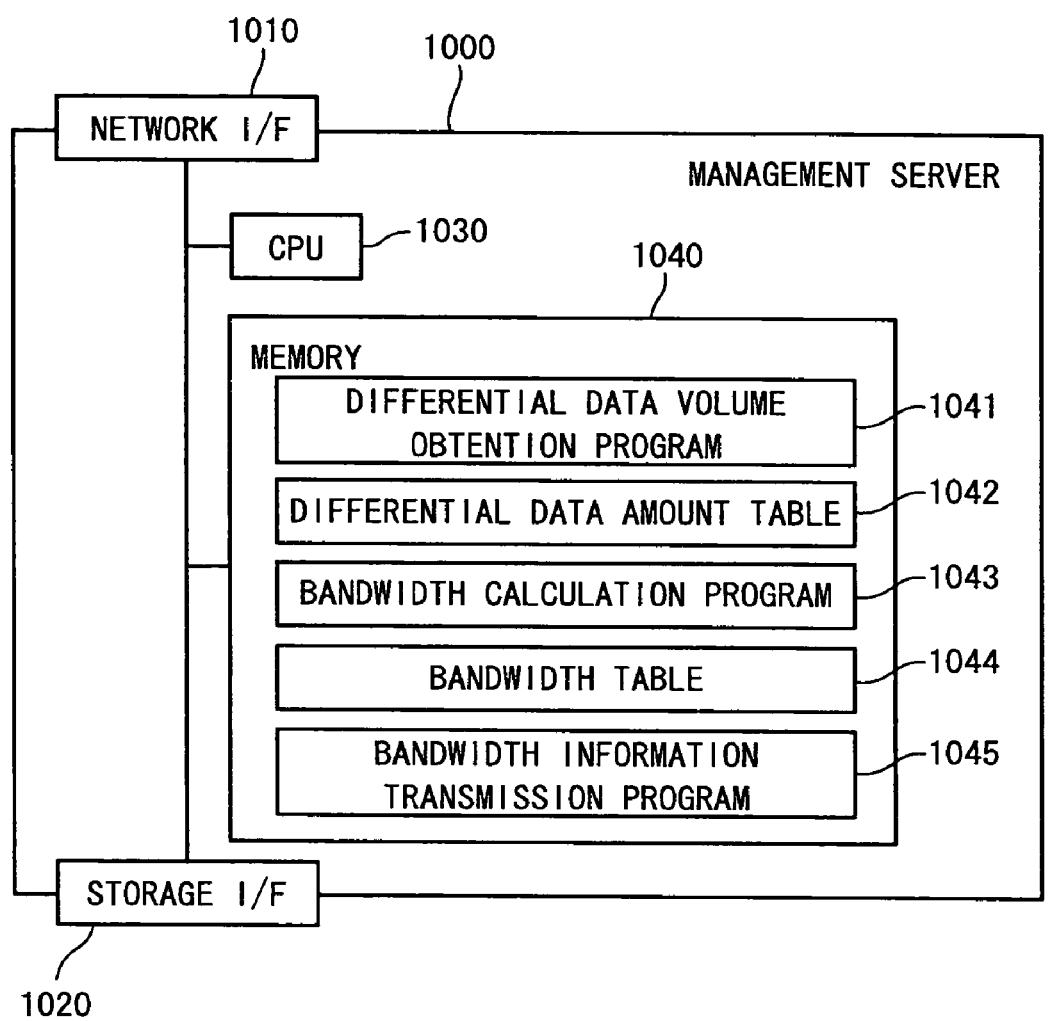
FIG. 6 is a block diagram of a management server according to the first embodiment.

FIG. 6 is a block diagram of the management server 1000 according to the first embodiment.

The management server 1000 includes the network I/F 1010, the storage I/F 1020, the CPU 1030, and a memory 1040. The individual components of the management server 1000 are connected to be communicable with each other.

The memory 1040 stores therein a differential data volume obtention program 1041, a differential data amount table 1042, a bandwidth calculation program 1043, a bandwidth table 1044, and a bandwidth information transmission program 1045.

As will be described later with reference to FIG. 7A, the differential data amount table 1042 shows the state of the differential data area 4061 of each of the primary storage systems 4000 and 4500. As will be described later with reference to FIG. 9, the CPU 1030 reads the differential data volume obtention program 1041 out of the memory 1040 and updates the differential data amount table 1042.

As will be described later with reference to FIG. 7B, the bandwidth table 1044 shows a bandwidth ratio for each of the primary storage systems 4000 and 4500. The bandwidth ratio is the proportion occupied by an amount of data in the storage system of concern to a total amount of data transferred by the router. As will be described later with reference to FIG. 10, the CPU 1030 reads the bandwidth calculation program 1043 out of the memory 1040 and calculates a bandwidth ratio for each of the primary storage systems 4000 and 4500.

As will be described later with reference to FIG. 11, the CPU 1030 reads the bandwidth information transmission program 1045 out of the memory 1040 and transmits bandwidth information to the router 6000.

FIG. 7A is a structural diagram of a differential data amount table 1042 stored in the management server 1000 according to the first embodiment.

The differential data amount table 1042 includes a system ID 10421, a differential data area volume 10422, an used capacity 10423, and an increment or decrement 10424.

The system ID 10421 is an identifier which specifies the primary storage system 4000 or 4500. The differential data area volume 10422 is the capacity of the differential data area 4061 in the cache 4060 of the primary storage system 4000 or 4500. The used capacity 10423 is the proportion occupied by the differential data area 4061 in the cache 4060 of the primary storage system 4000 or 4500. The increment or decrement 10424 is an amount of gain or loss in the proportion occupied by the differential data area 4061 in the cache 4060 of the primary storage system 4000 or 4500 which has been measured from the timing of the previous obtention of the used capacity.

FIG. 7B is a structural diagram of the bandwidth table 1044 stored in the management server 1000 according to the first embodiment.

The bandwidth management table 1044 includes a system ID 10441 and a bandwidth ratio 10442. The system ID 10441 is an identifier which specifies the primary storage system 4000 or 4500. The bandwidth ratio 10442 is the proportion of a bandwidth that can be used by the primary storage system 4000 or 4500 for remote copy.

FIG. 8 is a structural diagram of the bandwidth table 6061 stored in the router 6000 according to the first embodiment.

The bandwidth table 6061 includes a system ID 60611, a bandwidth ratio 60612, and a cue ID 60613.

The system ID 60611 is an identifier which specifies the primary storage system 4000 or 4500. The bandwidth ratio 60612 is the proportion of the bandwidth that can be used by the primary storage system 4000 or 4500 for remote copy. The cue ID 60613 is an identifier of a storage area in the buffer 6070 of the router 6000.

Referring to FIGS. 1 to 4, a description will be given hereinbelow to the process in which the application server 2000 writes data in the primary storage system 4000 and performs the remote copy of the data from the primary storage system 4000 to the backup storage system 5000.

The application server 2000 transmits a data write request to the primary storage system 4000 via the switch 3000. Upon receipt of the request, the primary storage system 4000 stores data related to the data write request in the volume 4070 and in the differential data area 4061 of the cache 4060. The primary storage system 4000 then transmits a data write completion response to the application server 2000 via the switch 3000.

At this stage, the primary storage system 4000 executes the remote copy program 4051. The primary storage system 4000 which executes the remote copy program 4051 reads the data write request out of the differential data area 4061 of the cache 4060. The primary storage system 4000 then transmits the data write request that has been read to the backup storage system 5000 via the router 6000, the broadband IP network 7000, and the router 6500.

Upon receipt of the data write request the backup storage system 5000 executes the remote copy program 5051. The backup storage system 5000 then stores the data on the received data write request in the volume 5070.

After storing the data in the volume 5070, the backup storage system 5000 transmits a data write completion response to the primary storage system 4000 via the router 6500, the broadband IP network 7000, and the router 6000.

Likewise, when the application server 2500 writes data in the primary storage system 4500, the primary storage system 4500 performs the remote copy of the data with respect to the backup storage system 5500.

Figure 9:
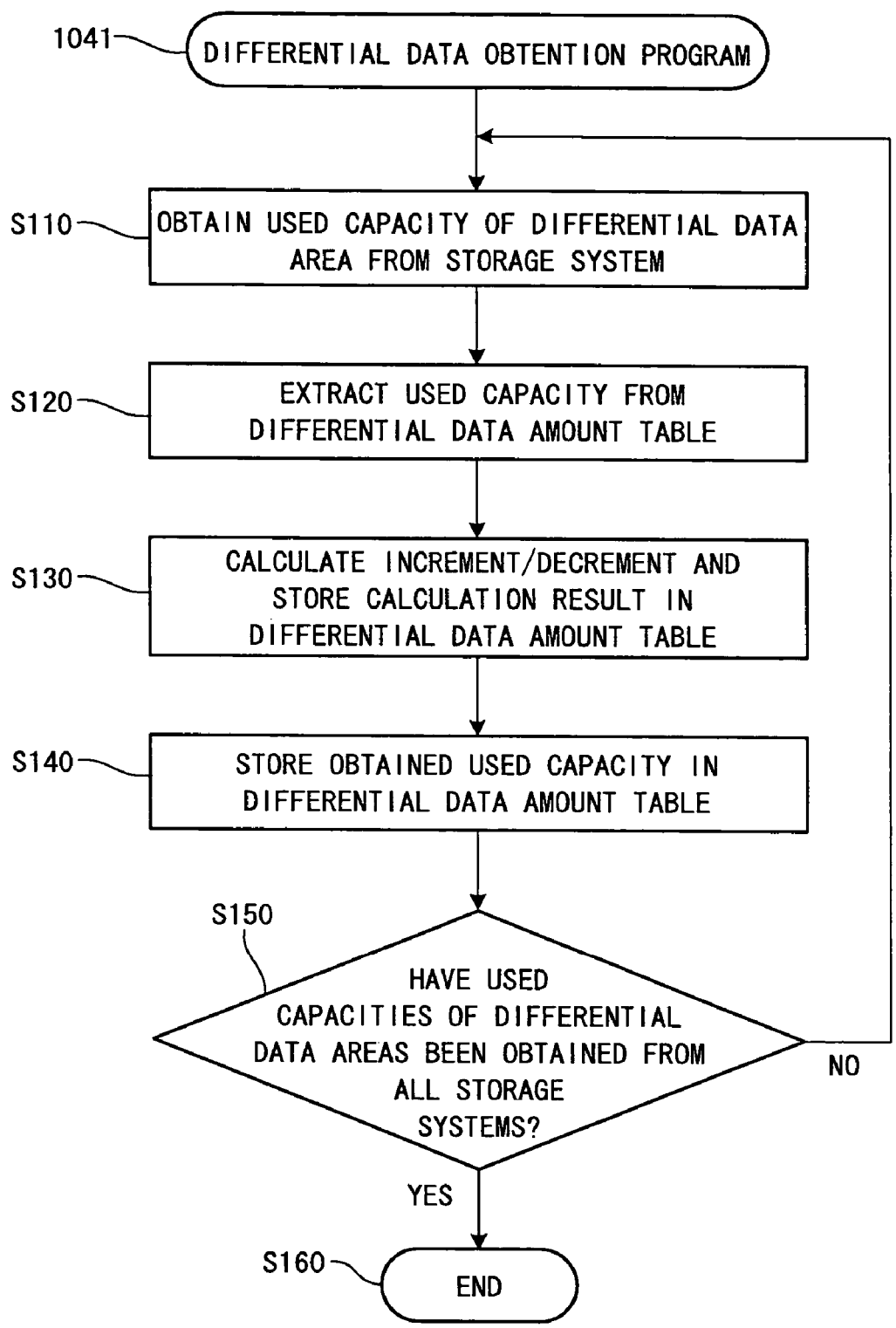
FIG. 9 is a flow chart of a process performed by the management server according to the first embodiment based on a differential data volume obtention program.
Figure 10:
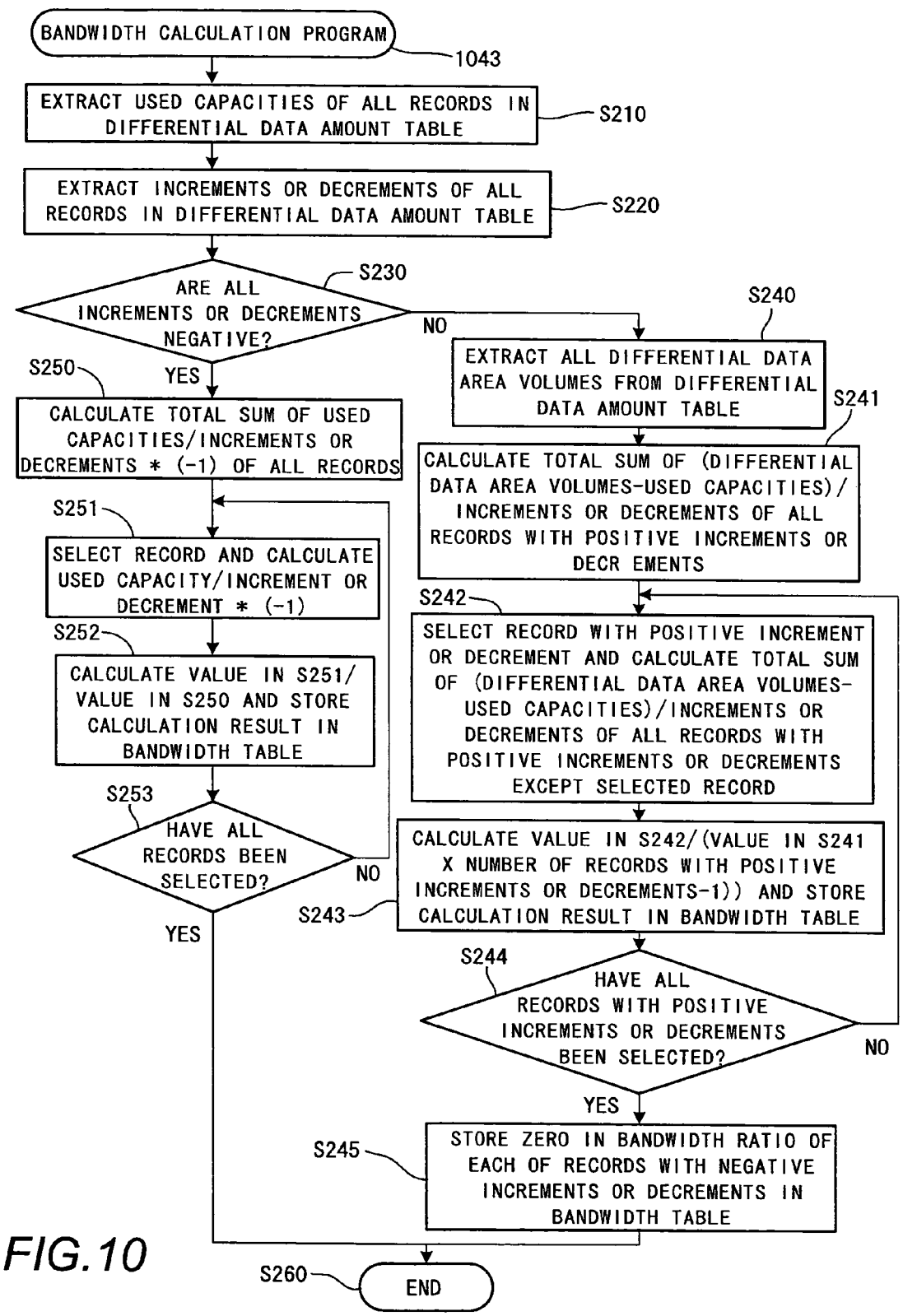
FIG. 10 is a flow chart of a process performed by the management server according to the first embodiment based on a bandwidth calculation program.
Figure 11:
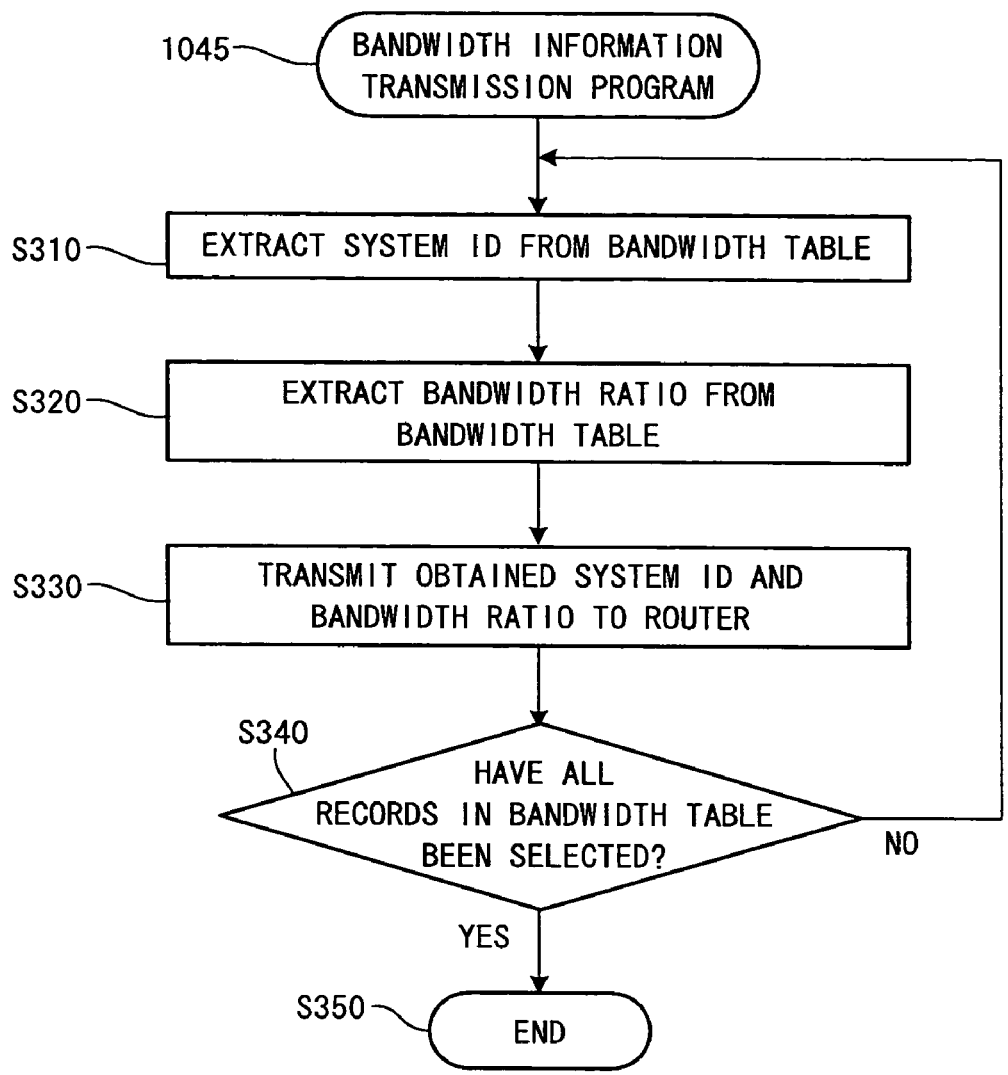
FIG. 11 is a flow chart of a process performed by the management server according to the first embodiment based on a bandwidth information transmission program.

A description will be given hereinbelow to the process in which the management server 1000 obtains the used capacity of the differential data area 4061 from the primary storage system 4000 or 4500 as shown in FIG. 9, determines the bandwidth ratio used for the remote copy as shown in FIG. 10, and transmits the determined bandwidth ratio to the router 6000 as shown in FIG. 11. The first embodiment periodically repeats this process.

FIG. 9 is a flow chart of the process performed by the management server 1000 according to the first embodiment based on the differential data volume obtention program 1041.

The management server 1000 reads the differential data volume obtention program 1041 out of the memory 1040 and executes it.

The management server 1000 accesses that one of the primary storage systems 4000 and 4500 for which it has not obtained the used capacity of the differential data area 4061 in the cache 4060 yet via the switch 3000. The management server 1000 then obtains the used capacity of the differential data area 4061 in the cache 4060 (S110).

Specifically, the management server 1000 obtains the used capacity of the differential data area 4061 from the value of a cache counter in the primary storage system 4000 or 4500. The management server 100 may also obtain the used capacity of the differential data area 4061 by using the network I/F 1010.

The management server 1000 extracts the used capacity 10423 of the record of the primary storage system 4000 from the differential data amount table 1042 (S120).

The management server 1000 subtracts the used capacity extracted in the step S120 from the used capacity obtained in the step S110 to determine an increment or decrement. The management server 1000 stores the determined increment or decrement in the increment or decrement 10424 of the record of the primary storage system of concern in the differential data amount table 1042 (S130).

Next, the management server 1000 stores the used capacity obtained in the step S110 in the used capacity 10423 of the record of the primary storage system of concern in the differential data amount table 1042 (S140).

The management server 1000 judges whether or not it has obtained the used capacity of the differential data area 4061 of each of the primary storage systems 4000 and 4500 to which it is connected (S150). Depending on the embodiment, it is also possible to judge whether or not the used capacities of the differential data areas 4061 have been obtained from specified (designated through inputting) one or more primary storage systems.

When the obtention of the used capacity from each of the primary storage systems 4000 and 4500 has not been completed, the whole process returns to the step S110 where the used capacity is obtained from the primary storage system 4000 or 4500 from which it has not been obtained yet.

On the other hand, when the obtention of the used capacity from each of the primary storage systems 4000 and 4500 has been completed, the differential data volume obtention program 1041 is ended (S160).

FIG. 10 is a flow chart of the process performed by the management server 1000 according to the first embodiment based on the bandwidth calculation program 1043.

The management server 1000 reads the bandwidth calculation program 1043 out of the memory 1040 and executes it.

The management server 1000 extracts the used capacity 10423 of all the record from the differential data amount table 1042 (S210).

The management server 1000 extracts the increment or decrement 10423 of all the record from the differential data amount table 1042 (S220).

The management server 1000 judges whether or not all the extracted increments or decrements 10424 are negative (S230).

When all the increments or decrements 10424 are negative, the management server 1000 advances the process to a step S250. When all the increments or decrements 10424 are not negative, the management server 1000 advances the process to a step S240.

When all the increments or decrements 10424 are not negative, the management server 1000 extracts the differential data area volumes 10422 of all the records in the differential data amount table 1042 therefrom (S240).

Next, the management server 1000 determines the time elapsed until the differential data area 4061 becomes full for each of the records with the positive increments or decrements 10424. The time elapsed until the differential data area 4061 becomes full is determined according to the following formula (1):

Time Elapsed Until Differential Data Area Becomes Full=(Differential Data Area Volume 10422−Activation Ratio 10423)/Increment or Decrement 10424 (1).

The management server 1000 determines the times elapsed until the differential data areas 4061 become full for all the positive records and then calculates the total sum of the determined times (S241).

Next, the management server 1000 selects, in a descending order, one record with the positive increment or decrement 10424 after another from the records stored in the differential data amount table 1042 and performs the following process with respect thereto.

The management server 1000 determines the times elapsed until the differential data areas 4061 become full for all the records with the positive increments or decrements except for the selected record and calculates the total sum of the times (S242).

Next, the management server 1000 determines the bandwidth ratio of the selected record. The bandwidth ratio is determined according to the following formula (2):

Bandwidth Ratio=Value Determined in S242/(Value Determined in S241×(Number of Records with Positive Increments or Decrements−1)) (2).

After determining the bandwidth ratio, the management server 1000 selects, from the bandwidth table 1044, the record having the system ID 10441 which coincides with the system ID 10421 of the record selected in the step S242. The management server 1000 stores the determined bandwidth ratio in the bandwidth ratio 10442 of the selected record in the bandwidth table 1044 (S243).

The management server 1000 judges whether or not all the records with the positive increments or decrements 10424 have been selected in the step S242 (S244).

When the selection of all the records with the positive increments or decrements 10424 has not been completed, the management server 1000 returns the whole process to the step S242 where it determines the bandwidth ratio of an unprocessed record.

On the other hand, when all the records with the positive increments or decrements 10424 have been selected, the system ID 10421 of each of the records with the negative increments or decrements 10424 is extracted. The management server 1000 then selects all the records each having the system ID 10441 which coincides with the system ID 10421 extracted from the bandwidth table 1044. The management server 1000 stores on in the bandwidth ratio 10442 of each of the selected records in the bandwidth table 1044 (S245).

Then, the management server 1000 ends the bandwidth calculation program 1043 (S260).

When all the increments or decrements 10424 are negative in the step S230, the management server 1000 determines the time elapsed until the differential data area 4061 becomes vacant for each of the records. The time elapsed until the differential data area 4061 becomes vacant is determined according to the following formula (3):

Time Elapsed Until Differential Data Area Becomes Vacant=Used Capacity 10423/Increment or Decrement 10424×(−1) (3).

The management server 1000 determines the times elapsed until the differential data areas 4061 become vacant for all the records and then calculates the total sum of the times (S250).

Next, the management server 1000 selects, in a descending order, one record after another in the differential data amount table 1042 and performs the following process with respect thereto.

The management server 1000 determines the time elapsed until the differential data area 4061 becomes vacant, which is given by the formula (3), for the selected record (S251).

Next, the management server 1000 determines the bandwidth ratio of the selected record. The bandwidth ratio is determined according to the following formula (4):

Bandwidth Ratio=Value Determined in S251/Value Determined in S250 (4).

After determining the bandwidth ratio, the management server 1000 selects, from the bandwidth table 1044, the record having the system ID 10441 which coincides with the system ID 10421 of the record selected in the step S251. The management server 1000 stores the determined bandwidth ratio in the bandwidth ratio 10442 of the selected record in the bandwidth table 1044 (S252).

The management server 1000 judges whether or not all the records in the differential data amount table 1042 have been selected (S253). When all the records have been selected, the management server 1000 ends the bandwidth calculation program (S260). On the other hand, when the selection of all the records has not been completed, the management server 1000 returns the process to the step S251 where it determines the bandwidth ratio of an unprocessed record.

FIG. 11 is a flow chart of the process performed by the management server 1000 according to the first embodiment based on the bandwidth information transmission program 1045.

The management server 1000 reads the bandwidth information transmission program 1045 out of the memory 1040 and executes it.

The management server 1000 selects, in a descending order, one record after another in the bandwidth table 1044 and performs the following process with respect thereto.

The management server 1000 extracts the system ID 10441 if the selected record from the bandwidth table 1044 (S310).

Next, the management server 1000 extracts the bandwidth ratio 10442 of the selected record from the bandwidth table 1044 (S320).

The management server 1000 transmits the extracted system ID 10441. and bandwidth ratio 10442 to the router 6000 (S330). The router 6000 receives the system ID 10441 and the bandwidth ratio 10442 from the management server 1000. The router 6000 that has received determines, from the bandwidth table 6061, the record having the system ID 60661 which coincides with the received system ID 10441. The router stores the bandwidth ratio 10442 received from the management server 1000 in the bandwidth ratio 60612 of the determined record.

The management server 1000 that has transmitted to the router 6000 judges whether or not all the records in the bandwidth table 1044 have been selected (S340). When all the records have been selected, the management server 1000 ends the bandwidth calculation program (S350). On the other hand, when the selection of all the records has not been completed, the management server 1000 returns the whole process to Step S310 where it transmits the system ID 10441 and bandwidth ratio 10442 of an unselected record to the router 6000.

Referring to FIGS. 4 and 5 mentioned above, a description will be given next to the process in which the router 6000 that has received the bandwidth ratio from the management server 1000 routes data from the primary storage system 4000 or 4500 to the backup storage system 5000 or 5500.

The router 6000 receives a data write request from the primary storage system 4000 or 4500. The router 6000 then selects, from the bandwidth table 6061, the record having the ID 60611 which coincides with the system ID of the storage system that has transmitted the data write request. The router 6000 then obtains the cue ID 60613 of the selected record.

The router 6000 stores the data write request that has been received in the cues 6071 and 6072 in the buffer 6070 as the obtained cue ID 60613.

When the data write request has been stored in the buffer 6070, the router 6000 reads the data routing program 6062 out of the memory 6060 and executes it.

The router 6000 which executes the data routing program 6062 extracts the cue ID 60613 and the bandwidth ratio 60612 from the bandwidth table 6061. The router 6000 then multiplies the maximum amount of data that can be routed according to the data routing program 6062 by the extracted bandwidth ratio 60612 to calculate the amount of data to be transferred. The router 6000 extracts, from each of the cues 6071 and 6072 in the buffer 6070, the data write request in a quantity corresponding to data to be transferred and transmits the extracted data write request to the router 6500 via the broadband IP network 7000.

Thus, the first embodiment prevents, in the case where the plural primary storage systems share the network used for remote copy, the cache of a given one of the primary storage systems from being overflown irrespective of a sufficient free capacity in the cache of another primary storage system. The first embodiment also prevents the refusal of a data write request from the host computer resulting from the overflowing of the cache and thereby improves the usability of the computer system.

Although the first embodiment has described above the structure in which the plural storage systems composing the group of storage systems have the individual caches of their own, this invention is also applicable to a single storage system.

For example, in the case where plural logic volumes and plural controllers 4090 are provided in a single storage system and the first and second logic volumes are accessed by different controllers 4090, the individual logic volumes use different caches 4060. In the case where the first and second logic volumes constitute different copy groups, the respective controllers 4090 thereof perform remote copy with independent timings.

By thus controlling the respective bandwidth ratios used for the remote copy of the first logic volume and the remote copy of the second logic volume through the application of this embodiment to the storage system thus constructed, it becomes possible to prevent the respective caches corresponding to the individual logic volumes from being overflown and improve the usability of the storage system.

Second Embodiment

According to a second embodiment of this invention, the management server 1000 determines the bandwidth ratios based on the respective used capacities of the differential data areas 4061 of the primary storage systems 4000 and 4500. In other words, the second embodiment uses the bandwidth calculation program 1043 stored in the management server 100 which is different from that used in the first embodiment described above. As for the other components of the second embodiment, they are the same as those of the first embodiment so that the description thereof will be omitted.

Figure 12:
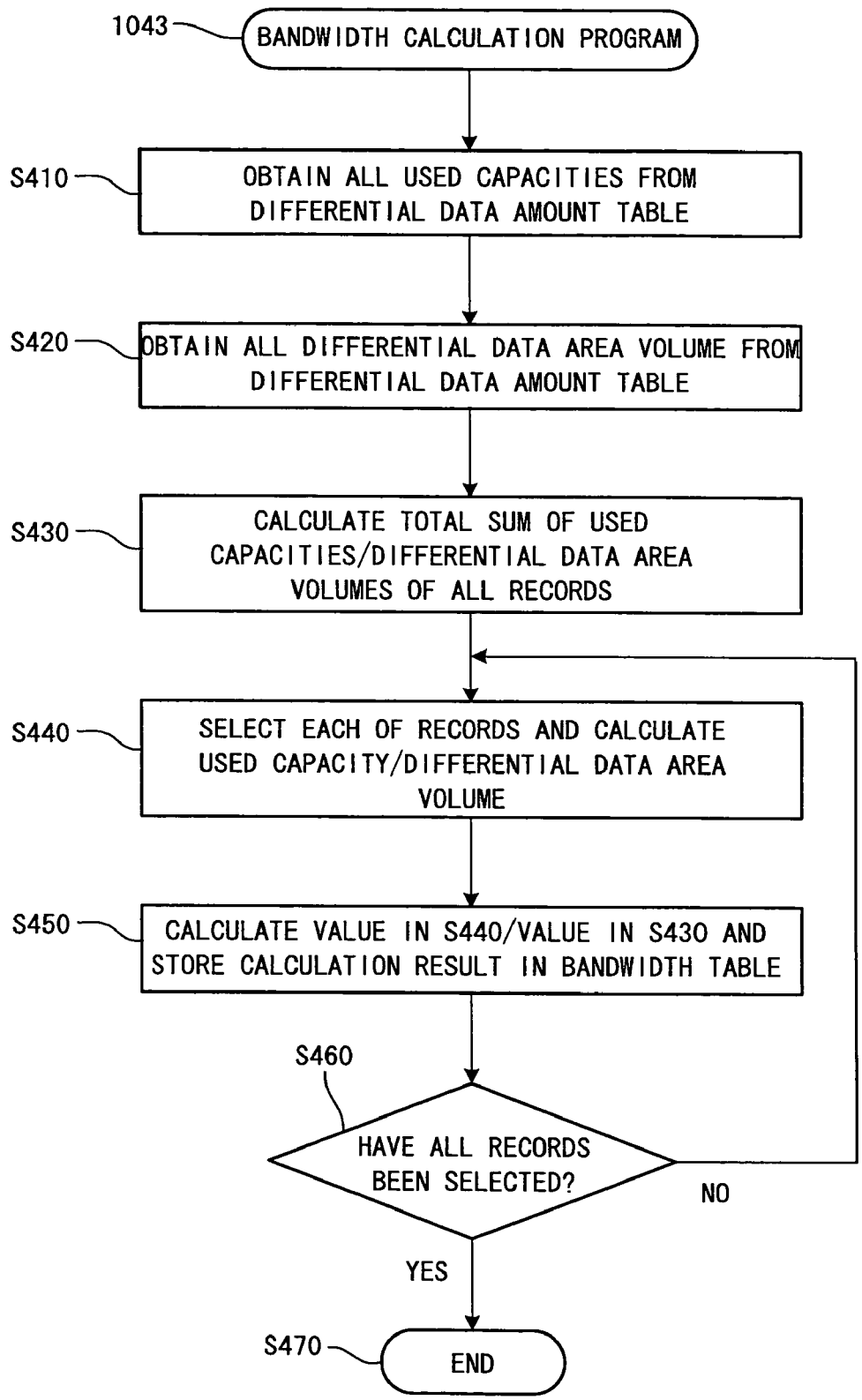
FIG. 12 is a flow chart of a process performed by a management server according to a second embodiment of this invention based on a bandwidth calculation program.

FIG. 12 is a flow chart of the process performed by the management server 1000 according to the second embodiment based on the bandwidth calculation program 1043.

The management server 1000 reads the bandwidth calculation program 1043 out of the memory 1040 and executes it.

The management server 1000 extracts the used capacity 10423 of all the record from the differential data amount table 1042 (S410).

Next, the management server 1000 extracts the differential data area volume of all the record from the differential data amount table 1042 (S420).

The management server 1000 determines the used capacity of the differential data area 4061 for each of the records. The used capacity of the differential data area 4061 is determined according to the following formula (5):

Used Capacity of Differential Data Area=Used Capacity 10423/Differential Data Area Volume 10422    (5).

After determining the used capacities of the differential data areas 4061 for all the records, the management server 1000 calculates the total sum of the used capacities (S430).

Then, the management server 1000 selects, in a descending order, one record after another in the differential data amount table 1042 and performs the following process with respect thereto. The management server 1000 determines the used capacity of the differential data area 4061 for the selected record by using the formula (5) (S440).

Next, the management server 1000 determines the bandwidth ratio of the selected record. The bandwidth ratio is determined according to the following formula (6):

$$\text{Bandwidth Ratio} = \text{Value Determined in S440} / \text{Value Determined in S430} \quad (6).$$

After determining the bandwidth ratio, the management server 1000 selects, from the bandwidth table 1044, the record having the system ID 10441 which coincides with the system ID 10421 of the record selected in the step S440. The management server 1000 stores the determined bandwidth ratio in the bandwidth ratio 10442 of the determined record in the bandwidth table 1044 (S450).

The management server 1000 judges whether or not all the have been selected in the step S440 (S460). When all the records have been selected, the management server 1000 ends the bandwidth calculation program 1043 (S470). On the other hand, when the selection of all the records has not been completed, the management server 1000 returns the process to the step S440 where it determines the bandwidth ratio of an unselected record.

Third Embodiment

In a third embodiment of this invention, the backup storage systems 5000 and 5500 predominantly perform the remote copy between the storage systems. Accordingly, the third embodiment is different from the first embodiment described above in that the management server 1100 is disposed on the side with the backup storage systems 5000 and 5500 relative to the intervening broadband IP network 7000 and a differential volume is provided in each of the primary storage systems 4000 and 4500. As for the other components of the third embodiment, they are the same as those of the first through second embodiments so that the description thereof will be omitted.

Figure 13:
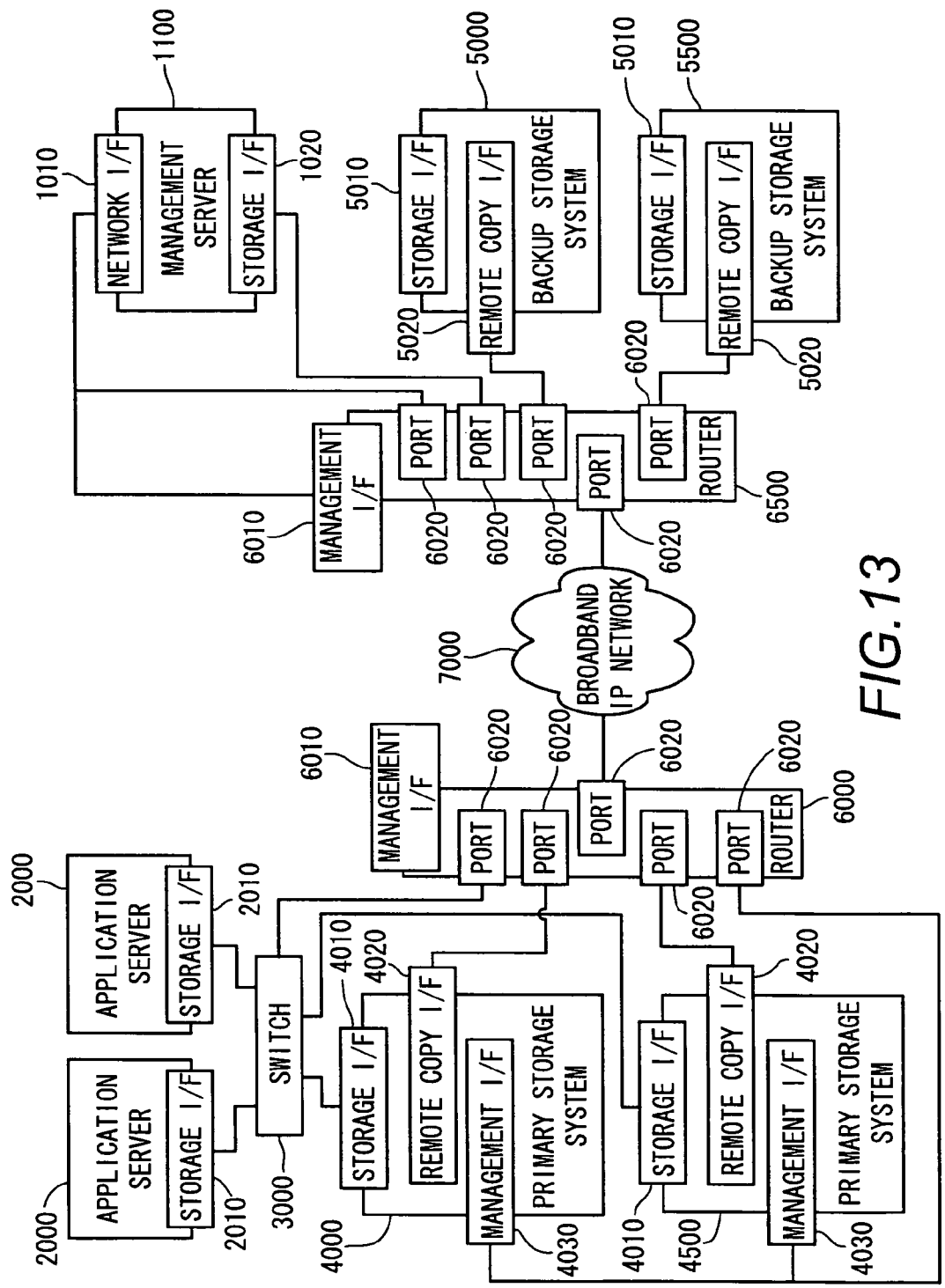
FIG. 13 is a block diagram of a computer system according to a third embodiment of this invention.

FIG. 13 is a block diagram of a computer system according to the third embodiment.

The management server 1100 includes the network I/F 1010 and the storage I/F 1020. The network I/F 1010 is connected to the management I/F 6010 and port 6020 of the router 6500. The storage I/F 1020 is connected to the port 6020 of the router 6500.

When the storage I/F 1020 is used, the management server 1100 communicates with the storage I/F 4010 of the primary storage system 4000 or 4500 via the router 6500, the broadband IP network 7000, the router 6000, and the switch 3000. When the network I/F 1010 is used, the management server 1100 communicates with the management I/F 4030 of the primary storage system 4000 or 4500 via the router 6500, the broadband IP network 7000, and the router 6000.

Figure 14:
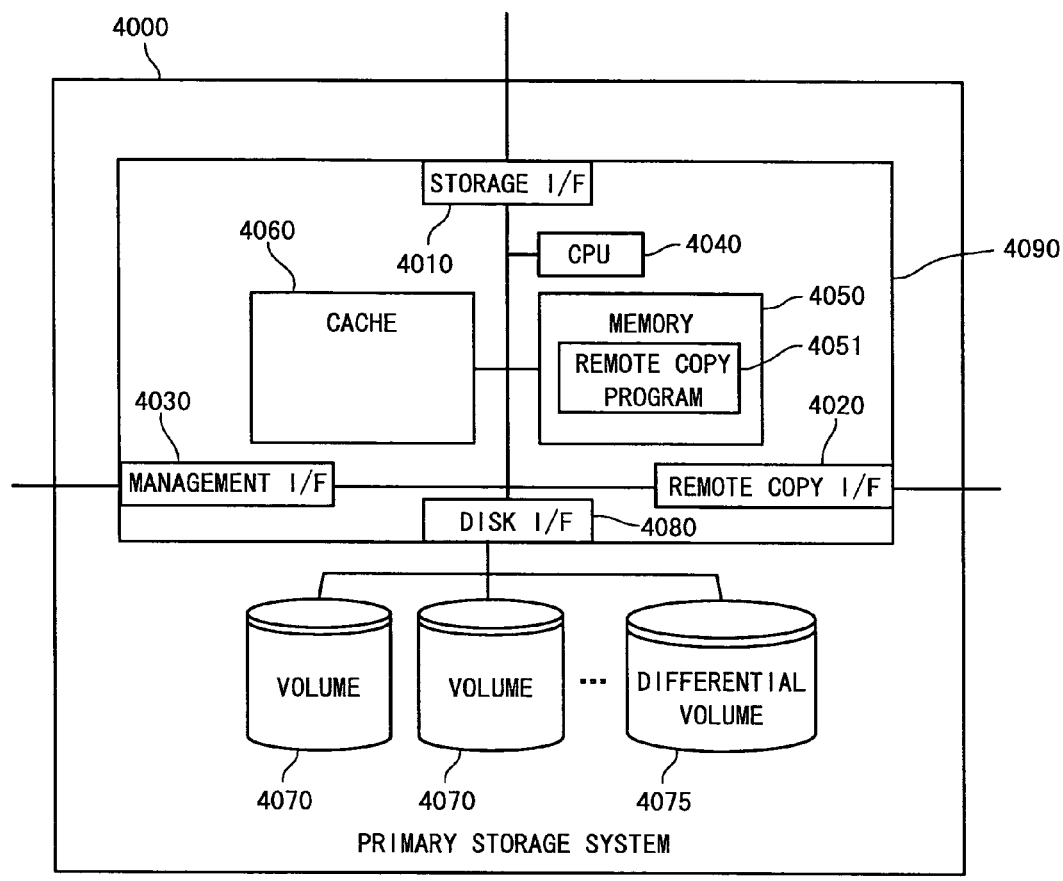
FIG. 14 is a block diagram of a primary storage system according to the third embodiment.

FIG. 14 is a block diagram of the primary storage system 4000 according to the third embodiment.

The primary storage system 4000 according to the third embodiment includes a differential volume 4075. Accordingly, the differential data area 4061 in the cache 4060 becomes unnecessary.

The differential volume 4075 temporarily stores therein data transmitted and received between the storage I/F 4010 and the remote copy I/F 4020, similarly to the differential data area 4061.

Referring to FIGS. 13 and 14, a description will be given hereinbelow to the process in which the application server 2000 writes data in the primary storage system 4000 and performs the remote copy of the data from the primary storage system 4000 to the backup storage system 5000.

The application server 2000 transmits a data write request to the primary storage system 4000 via the switch 3000. The primary storage system 4000 then stores data on the data write request in each of the volume 4070 and the differential volume 4075. The primary storage system 4000 then transmits a data write completion response to the application server 2000 via the switch 3000.

On the other hand, the backup storage system 5000 executes the remote copy program 5051. The backup storage system 5000 transmits a data read request for the differential volume 4075 to the primary storage system 4000 via the router 6500, the broadband IP network 7000, and the router 6000 based on the remote copy program 5051.

Upon receipt of the data read request, the primary storage system 4000 reads the data from the differential volume 4075. The primary storage system 4000 then transmits the read data to the backup storage system 5000. The backup storage system 5000 stores the received data in the volume 5070.

Thus, the data written by the application server 2000 in the primary storage system 4000 is remote copied from the primary storage system 4000 to the backup storage system 5000.

The management server 1000 according to the third embodiment controls the bandwidth of the router 6500 by the same method as used in the first embodiment.

Specifically, the management server 1000 obtains the used capacity of the differential volume 4075 from each of the primary storage systems 4000 and 4500. The management server 1000 then executes the bandwidth calculation program 1043 to determine the bandwidth ratio for each of the primary storage systems 4000 and 4500 based on the used capacity of the differential volume 4075. The bandwidth ratio is determined by executing the bandwidth ratio calculation program shown in FIG. 10 or 12 according to the first or second embodiment. The management server 1000 transmits the determined bandwidth ratio to the router 6500.

The router 6500 then transmits, to the router 6000, a data read request from the backup storage system 5000 or 5500 in a quantity corresponding to the received bandwidth ratio. Specifically, the quantities of the data read requests to be transferred are determined based on the reciprocals of the bandwidth ratios determined from the used capacities of the differential volumes 4075. Accordingly, the quantities of the data read requests to be transferred are larger as the used capacities of the differential volumes 4075 are higher and the quantities of the data read requests to be transferred are smaller as the used capacities of the differential volumes 4075 are lower.

In addition to controlling the bandwidth of the router 6500, the third embodiment controls a data obtention interval at each of the backup storage systems 5000 and 5500.

Figure 15:
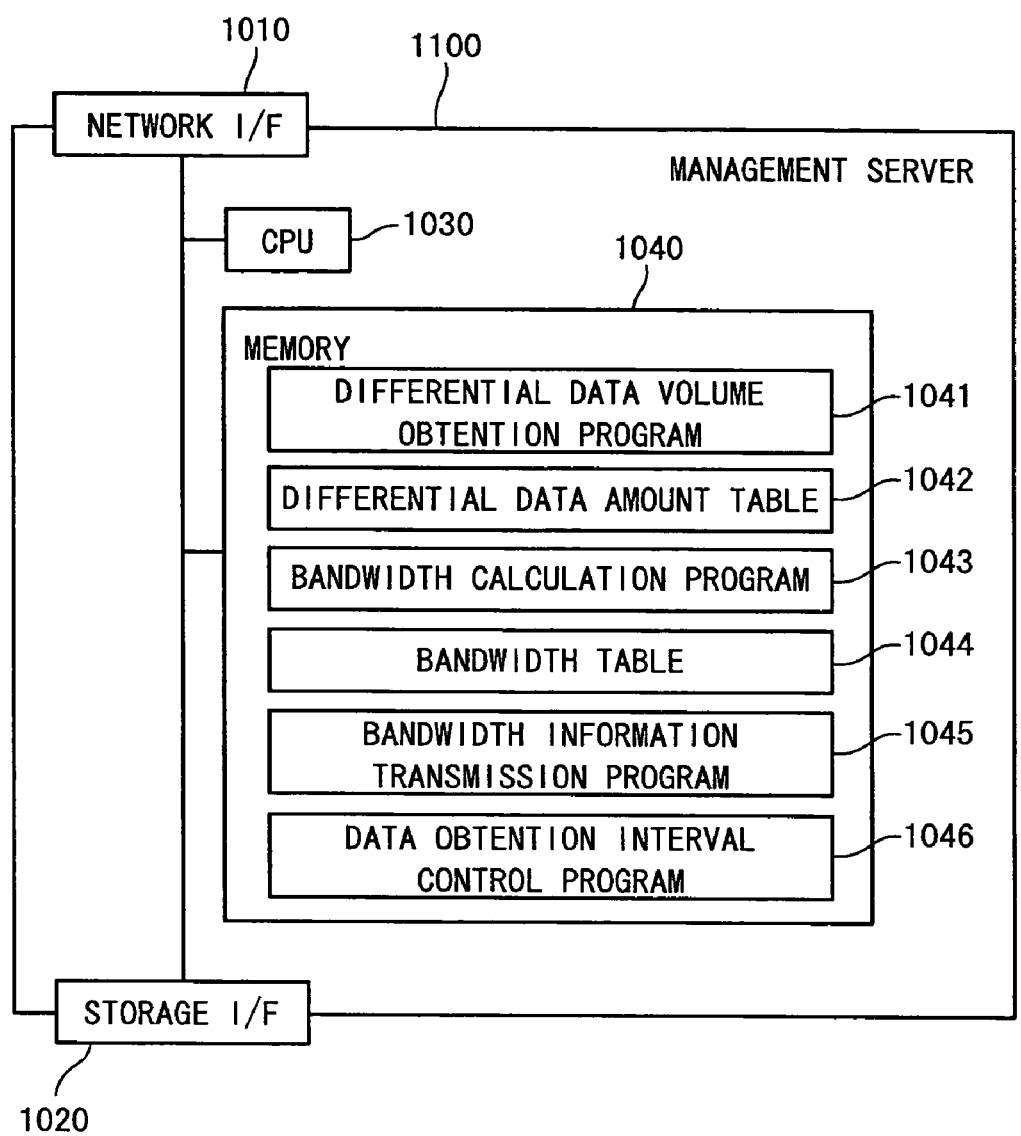
FIG. 15 is a block diagram of a management server according to the third embodiment.

FIG. 15 is a block diagram of the management server 1000 according to the third embodiment.

The memory 1040 of the management server 1000 according to the third embodiment stores therein a data obtention interval control program 1046. As for the other components of the management server 1000 according to the third embodiment, they are the same as those of the management server 1000 according to the first embodiment so that the description thereof will be omitted.

The management server 1000 controls the data obtention interval at each of the backup storage systems 5000 and 5500 by reading and executing the data obtention interval control program 1046.

Specifically, the management server 1000 which executes the data obtention interval control program 1046 determines such a data obtention interval as to protect the differential volume 4075 of each of the primary storage systems 4000 and 4500 from becoming full by the same method as used to determine the bandwidth ratios illustrated in FIGS. 10 and 12. For example, the management server 1000 determines the data obtention interval according to the ratio between the respective reciprocals of the bandwidth ratios of the primary storage systems 4000 and 4500.

The management server 1000 controls the backup storage systems 5000 and 5500 such that data is obtained at the determined data obtention intervals. The data obtention intervals at the backup storage systems 5000 and 5500 are controlled with the timings of transmitting data read requests to the primary storage systems 4000 and 4500.

Thus, according to the third embodiment, the management server 1000 determines the data obtention intervals based on the used capacities of the differential volumes 4075. Specifically, the data obtention intervals are determined based on the reciprocals of the bandwidth ratios calculated from the used capacities of the differential volumes 4075. Accordingly, the data obtention intervals are shorter as the used capacities of the differential volumes 4075 are higher. The data obtention intervals are longer as the used capacities of the differential volumes 4075 are lower.

The management server 1000 may control the data obtention intervals either simultaneously with the control of the bandwidth of the router 6500 or independently thereof.

Fourth Embodiment

A fourth embodiment of this invention will describe the case where systems using the primary storage systems 4000 and 4500 have different degrees of importance.

The fourth embodiment of this invention is applicable to the first through third embodiments described above but the operation of the management server 1000 is different. As for the other components of the fourth embodiment, they are the same as those of the first through third embodiments so that the description thereof will be omitted.

Figures 16, 17:
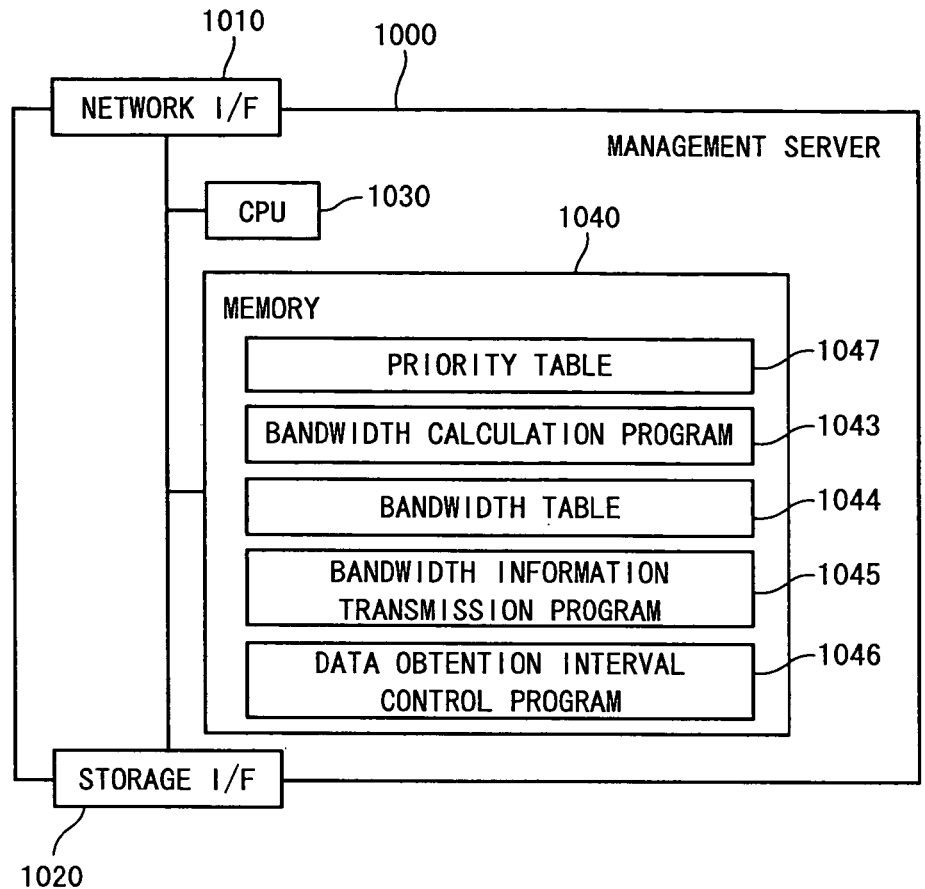
FIG. 16 is a block diagram of a management server according to a fourth embodiment of this invention.
FIG. 17 is a structural diagram of a priority table stored in the management server according to the fourth embodiment.

FIG. 16 is a block diagram of the management server 1000 according to the fourth embodiment.

The memory 1040 of the management server 1000 according to the fourth embodiment stores therein a priority table 1047 instead of the differential data volume obtention program 1041 and the differential data amount table 1042.

FIG. 17 is a structural diagram of the priority table 1047 stored in the management server 1000 according to the fourth embodiment.

The priority table 1047 is composed of a system ID 10471 and a priority 10472. The system ID 10471 is an identifier which specifies the primary storage system 4000 or 4500. The priority 10472 shows a priority in the remote copy executed by the primary storage systems 4000 and 4500. It is to be noted that the priority 10472 is determined preliminarily.

In the case where the backup storage systems 5000 and 5500 predominantly execute the remote copy as in the third embodiment, the priorities are determined in association with the backup storage systems 5000 and 5500. The priorities may also be determined in association with remote copy pairs.

A description will be given next to the process in which the management server 1000 according to the fourth embodiment determines the bandwidth ratio.

The management server 1000 selects, in a descending order, one record after another which are stored in the priority table 1047 and determines the bandwidth ratio by using the priority of the selected record. The bandwidth ratio is determined according to the following formula (7):

Bandwidth Ratio=Priority 10427 of Selected Record/ Total Sum of Priorities 10427 of All Records  (7).

After determining the bandwidth ratio, the management server 1000 determines, from the bandwidth table 1044, the record having the system ID 10441 which coincides with the system ID 10426 of the selected record. The management server 1000 stores the determined bandwidth ratio in the bandwidth ratio 10442 of the determined record in the bandwidth table 1044.

Since the subsequent process is the same as in the first through third embodiments to which the fourth embodiment is applied, the description thereof will be omitted.

In other words, according to the fourth embodiment, the management server 1000 controls the routing of data by the router 6000 based on the priorities determined in association with the primary storage systems 4000 and 4500. Specifically, a higher proportion of the network is allocated as the priority is higher. On the other hand, a lower proportion of the network is allocated as the priority is lower.

It is more effective for the management server 1000 to determine the bandwidth ratio in consideration of not only the priorities but also the used capacities of the differential data areas 4061 or of the differential volumes 4075 or the like.

Thus, the fourth embodiment of this invention allows the bandwidth of the network shared by the plural storage systems to be allocated in consideration of the degrees of importance of the systems using the storage systems.

Fifth Embodiment

A fifth embodiment of this invention is different from the foregoing first embodiment in that it includes a second broadband IP network which is not used normally in addition to the first broadband IP network which is used normally for the remote copy. As for the other components of the fifth embodiment, they are the same as in the first through fourth embodiments so that the description thereof will be omitted.

Figure 18:
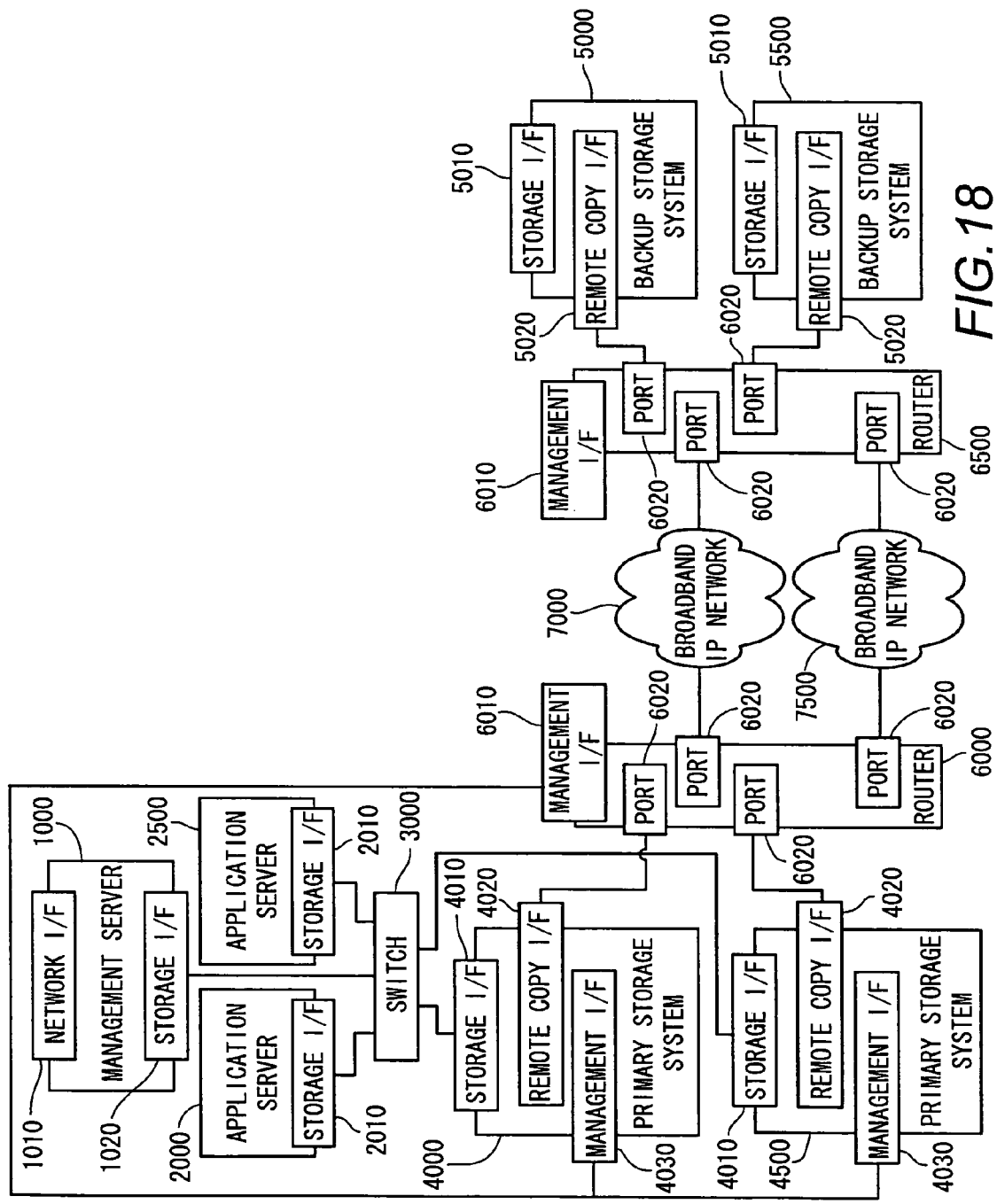
FIG. 18 is a block diagram of a computer system according to a fifth embodiment of this invention.

FIG. 18 is a block diagram of a computer system according to the fifth embodiment.

The computer system according to the fifth embodiment includes the first broadband IP network 7000 and a second broadband IP network 7500 each between the routers 6000 and 6500.

For example, the first broadband IP network 7000 is a dedicated network and is used normally for the remote copy. On the other hand, the second broadband IP network 7500 is a WAN and is not used normally for the remote copy. The second broadband IP network 7500 is used when the differential data area of the primary storage system 4000 or 4500 is likely to be overflown.

Figure 19:
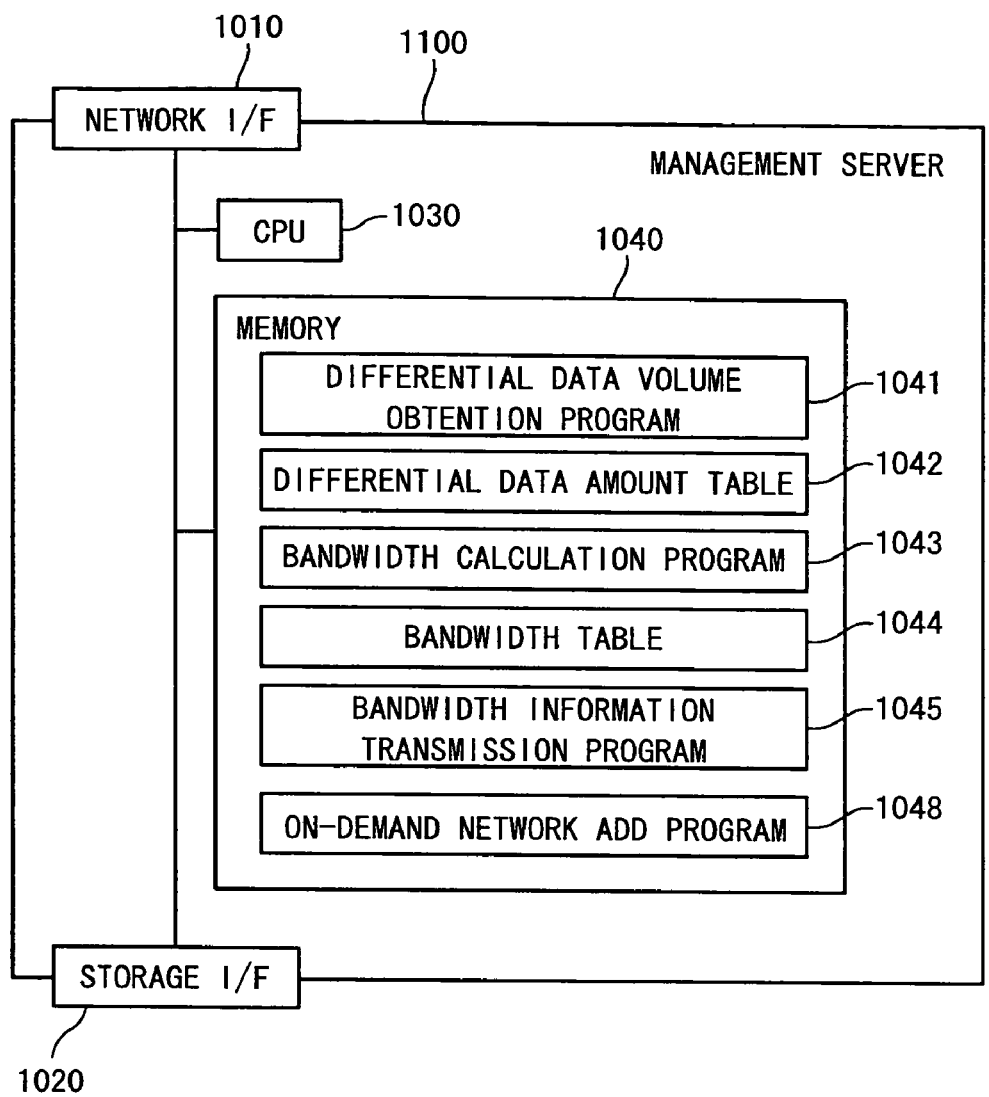
FIG. 19 is a block diagram of a management server according to the fifth embodiment.

FIG. 19 is a structural diagram of the priority table 1047 stored in the management server 1000 according to the fifth embodiment.

The memory 1040 of the management server 1000 according to the fifth embodiment stores therein an on-demand network add program 1048. The on-demand network add program 1048 judges whether or not the broadband IP network 7500 should be used based on the used capacity of the differential data area 4061.

Figure 20:
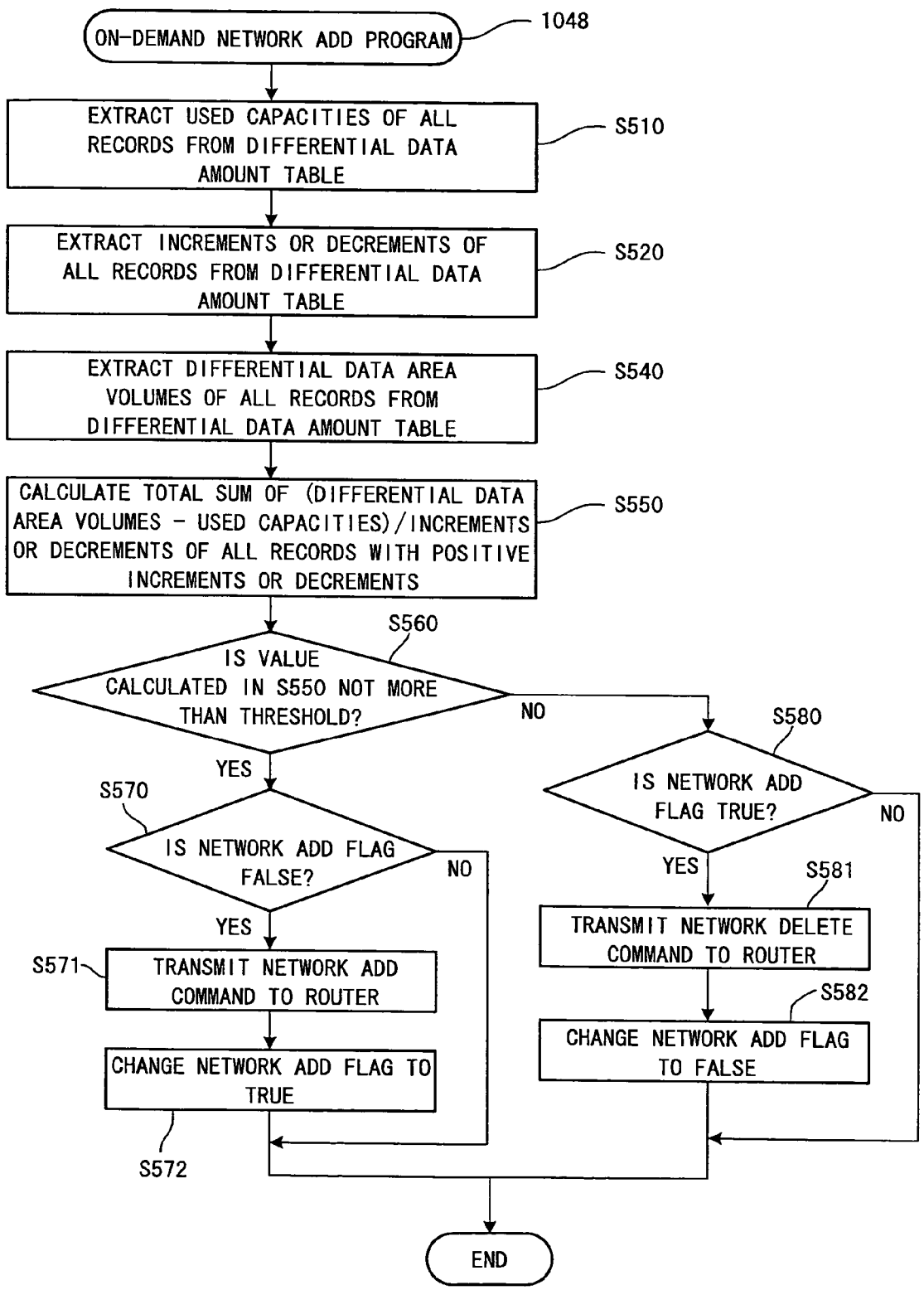
FIG. 20 is a flow chart of a process performed by the management server according to the fifth embodiment based on an on-demand network add program.

FIG. 20 is a flow chart of the process performed by the management server 1000 according to the fifth embodiment based on the on-demand network add program 1048.

The management server 1000 reads the on-demand network add program 1048 out of the memory 1040 and executes it.

The management server 1000 extracts the used capacity 10423 of all the record from the differential data amount table 1042 (S510).

The management server 1000 extracts the increment or decrement 10424 of all the record from the differential data amount table 1042 (S520).

The management server 1000 extracts the differential data area volume 10422 of all the record from the differential data amount table 1042 (S540).

Then, the management server 1000 determines, for all the records with the positive increments or decrements, the times elapsed until the differential data areas 4061 become full by using the foregoing formula (1). After determining the times until the differential data areas 4061 become full for all the records with the positive increments or decrements, the management server 1000 calculates the total sum of the times (S550).

The management server 1000 judges whether or not the total sum of the times determined in the step 550 is not more than a threshold value (S560).

If the total sum of the times is not more than the threshold value, the possibility of the overflowing of the cache in a short period of time is high so that the management server 1000 advances the whole process to a step S570 to add the second broadband IP network 7500. If the total sum of the times is more than the threshold value, on the other hand, the possibility of the overflowing of the cache is low so that the management server 1000 advances the whole process to a step S580 to halt the remote copy using the second broadband IP network 7500.

When the total sum of the times is not more than the threshold value, the management server 1000 judges whether or not a network add flag is false (S570). The network add flag is a flag indicative of the use state of the second broadband IP network 7500, which is either true or false. In the case of true, the second broadband IP network 7500 is used for the remote copy. In the case of false, the second broadband IP network 7500 is not used for the remote copy.

When the network add flag is not false, the management server 1000 ends the on demand network add program 1048 since the second broadband IP network 7500 has been used already for the remote copy (S590). When the network add flag is false, on the other hand, the management server 1000 transmits a network add command to the router 6000 (S571). Upon receipt of the network add command, the router 6000 uses the second broadband IP network 7500 for the remote copy.

The management server 1000 that has transmitted the network add command changes the network add flag from false to true (S572).

Then, the management server 1000 ends the on-demand network add program 1048 (S590).

When the total sum of the times is more than the threshold value. in the step S560, the management server 1000 judges whether or not the network add flag is true (S580).

When the network add flag is not true, the second broadband IP network 7500 is not used for the remote copy so that the management server 1000 ends the on-demand network add program 1048 (S590).

When the network add flag is true, on the other hand, the second broadband IP network 7500 is being used for the remote copy so that the management server 1000 transmits a network delete command to the router 6000 (S581). The management server 1000 then changes the network add flag to false (S582) and ends the on-demand network add program 1048 (S590).

Thus, according to the fifth embodiment, the management server 1000 determines whether or not the second broadband IP network 7500 should be used based on the used capacity of the differential data area 4061. Specifically, whether or not the second broadband IP network 7500 should be used for the remote copy is determined based on the time elapsed until the differential data area 4061 becomes full. Accordingly, the second broadband IP network 7500 is used for the remote copy when the used capacity of the differential data area 4061 is high. The second broadband IP network 7500 is not used for the remote copy when the used capacity of the differential data area 4061 is low.

Thus, according to the fifth embodiment, the broadband IP network 7500 for use in emergency is used when data is likely to be overflown from the differential data area 4061 of the primary storage system 4000 or 4500 so that data is no more overflown.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   a work computer;
   a plurality of first storage systems each of which stores therein data used by the work computer;
   a plurality of second storage systems each of which stores therein a copy of the data stored in one of the first storage systems;
   a network used for data transfer from one of the first storage systems to one of the second storage systems;
   a network routing device which routes data between the network and the first storage system and between the network and the second storage system; and
   a management computer connected to the first storage systems and to the network routing device to control at least one of the network routing device and the first storage systems, wherein:
   each of the first storage systems comprises:
   a first storage area which stores therein update data transmitted from the work computer;
   a second storage area which stores therein the update data until the update data is transferred to the second storage system; and
   a controller which controls inputting and outputting of the data to and from the first and second storage areas,
   receives the update data from the work computer, stores the update data in the first storage area, and stores the update data in the second storage area until the update data is transferred to the second storage system; and
   the management computer obtains a used capacity of the second storage area of each of the first storage systems and controls routing of the data by the network routing device based on the obtained used capacity,
   wherein the management computer:
   determines the used capacity of the second storage area of each of the first storage systems; and
   transmits, to the network routing device, an instruction to allocate a wide bandwidth of the network to the one of the first storage systems in which the used capacity is high and allocate a narrow bandwidth of the network to the one of the first storage systems in which the used capacity is low, and wherein the management computer:
  determines, based on the obtained used capacity, a time elapsed until the second storage area of each of the first storage systems becomes full; and
  transmits, to the network routing device, an instruction to allocate a narrow bandwidth of the network to the one of the first storage systems in which the time elapsed until the second storage area becomes full is long and allocate a wide bandwidth of the network to the one of the first storage systems in which the time elapsed until the second storage area becomes full is short.

2. A computer system according to claim 1, wherein the management computer extracts increments or decrements of all records in a differential data amount table and determines if all said increments or decrements are negative after the used capacities have been determined.

3. The computer system according to claim 2, wherein the management computer:
  determines, based on the obtained used capacity, a time elapsed until the second storage area of each of the first storage systems becomes empty; and
  transmits, to the network routing device, an instruction to allocate a wide bandwidth of the network to the one of the first storage systems in which the time elapsed until the second storage area becomes empty is long and allocate a narrow bandwidth of the network to the one of the first storage systems in which the time elapsed until the second storage area becomes empty is short.

4. The computer system according to claim 1, wherein each of the first storage systems:
  reads the update data from the second storage area at a predetermined timing, and
  transmits the update data that has been read to one of the second storage systems.

5. The computer system according to claim 1, wherein:
  one of the second storage systems requests, of one of the first storage systems, the update data stored in the second storage area thereof at a given timing; and
  the first storage system reads the update data from the second storage area upon receiving of the request from the second storage system and transmits the update data that has been read from one of the second storage systems.

6. The computer system according to claim 5, wherein the management computer determines the given timing based on the obtained used capacity.

7. The computer system according to claim 5, wherein the management computer controls, based on the obtained used capacity, a quantity of the update data request to be transmitted which is routed by the network routing device.

8. The computer system according to claim 1, wherein the management computer:
  obtains a priority determined in association with each of the first storage systems, and
  controls the routing of the data by the network routing device based on the used capacity and the priority.

9. The computer system according to claim 1, wherein:
  the network includes a first network which is used normally for data transfer from one of the first storage systems to one of the second storage systems and a second network which is not used normally for the data transfer from the first storage system to the second storage system; and
  the management computer determines, based on the obtained used capacity, whether the second network should be used for the data transfer from the first storage system to the second storage system.

10. The computer system according to claim 1, wherein:
  each of the first storage systems has a plurality of the first storage areas, and a plurality of the second storage areas associated with the first storage areas; and
  the management computer obtains an used capacity of each of the second storage areas and controls, based on the obtained used ratio of each of the second storage areas, the routing of data for each of the second storage areas by the network routing device.

11. A management computer connected to a computer system comprising: a work computer; a plurality of first storage systems each of which stores therein data used by the work computer; a plurality of second storage systems each of which stores therein a copy of the data stored in one of the first storage systems; a network used for data transfer from one of the first storage systems to one of the second storage systems; and a network routing device which routes data between the network and the first storage system and between the network and the second storage system to control at least one of the network routing device and the first storage systems, the management computer:
  obtaining a used capacity of a differential data area which stores therein update data transmitted from the work computer until it is transferred to one of the second storage systems; and
  controlling the routing of the data by the network routing device based on the obtained used capacity,
  wherein the management computer:
  determines the used capacity of the differential data area of each of the first storage systems; and
  transmits, to the network routing device, an instruction to allocate a wide bandwidth of the network to the one of the first storage systems in which the used capacity is high and allocate a narrow bandwidth of the network to the one of the first storage systems in which the used capacity is low, and
  wherein the management computer:
  determines, based on the obtained used capacity, a time elapsed until the differential data area of each of the first storage systems becomes full; and
  transmits, to the network routing device, an instruction to allocate a narrow bandwidth of the network to the one of the first storage systems in which the time elapsed until the differential data area becomes full is long and allocate a wide bandwidth of the network to the one of the first storage systems in which the time elapsed until the differential data area becomes full is short.

12. A computer system according to claim 11, wherein the management computer extracts increments or decrements of all records in a differential data amount table and determines if all said increments or decrements are negative after the used capacities have been determined.

13. The management computer according to claim 12, wherein the management computer:
  determines, based on the obtained used capacity, a time elapsed until the differential data area of each of the first storage systems becomes empty; and
  transmits, to the network routing device, an instruction to allocate a wide bandwidth of the network to the one of the first storage systems in which the time elapsed until the differential data area becomes empty is long and allocate a narrow bandwidth of the network to the one of the first storage systems in which the time elapsed until the differential data area becomes empty is short.

14. The management computer according to claim 11, wherein:
 one of the second storage systems requests, of one of the first storage systems, the update data stored in the differential data area at a predetermined timing;
 the first storage system reads the update data from the differential data area upon receiving of the request from the second storage system and transmits the update data that has been read from the differential data area; and
 the management computer determines, based on the obtained used capacity, the predetermined timing.

15. The management computer according to claim 11, wherein:
 one of the second storage systems requests, of one of the first storage systems, the update data stored in the differential data area with a predetermined timing;
 the first storage system reads the update data from the differential data area upon receiving of the request from the second storage system and transmits the update data that has been read from the differential data area; and
 the management computer controls, based on the obtained used capacity, a quantity of the update data request to be transmitted which is routed by the network routing device.

16. The management computer according to claim 11, wherein:
 the network includes a first network which is used normally for data transfer from one of the first storage systems to one of the second storage systems and a second network which is not used normally for the data transfer from the first storage system to the second storage system; and
 the management computer determines, based on the obtained used capacity, whether the second network is to be used for the data transfer from the first storage system to the second storage system.

17. A remote copy method for an computer system comprising: a work computer; a plurality of first storage systems each of which stores therein data used by the work computer; a plurality of second storage systems each of which stores therein a copy of the data stored in one of the first storage systems; a network used for data transfer from one of the first storage systems to one of the second storage systems; and a network routing device which routes data between the network and the first storage system and between the network and the second storage system, wherein:
 each of the first storage systems receives update data from the work computer and stores the update data in a differential data area until the update data is transferred to one of the second storage systems; and
 the management computer obtains a used capacity of the differential data area of each of the first storage systems, determines a time elapsed until the differential data area becomes full based on the obtained used capacity, and transmits, to the network routing device an instruction to allocate a narrow bandwidth of the network to the one of the first storage systems in which the time elapsed until the differential data area becomes full is long and allocate a wide bandwidth of the network to the one of the first storage systems in which the time elapsed until the differential data areas becomes full is short,
 wherein the management computer:
 determines the used capacity of the differential data area of each of the first storage systems; and
 transmits, to the network routing device, an instruction to allocate a wide bandwidth of the network to the one of the first storage systems in which the used capacity is high and allocate a narrow bandwidth of the network to the one of the first storage systems in which the used capacity is low.

18. A computer system comprising an application server, a primary storage system group, a backup storage system group, a broadband IP network, a router, and a management server, wherein
 the primary storage system group comprises a plurality of primary storage systems each comprising a cache, a storage I/F, a remote copy I/F, a network I/F, and a volume to store therein data used by the application server in the volume,
 the backup storage system group comprises a plurality of backup storage systems each comprising a storage I/F, a remote copy I/F, a network I/F, and a volume to store therein a copy of the data stored in the primary storage system group,
 the broadband IP network is used for data transfer from the primary storage system group to the backup storage system group,
 the router has ports to which the storage systems are connected and a management I/F to route the data between the broadband IP network and each of the primary storage systems and between the broad band IP network and each of the backup storage systems,
 the management server is connected to each of the primary storage system group via the network I/F and to the router to control the router,
 each of the primary storage systems provides the cache with a differential data area which stores therein update data transferred from the application server until it is transferred to one of the backup storage systems, receives the update data to be stored in the volume from the application server, stores the update data in the volume, and stores the update data in the differential data area until the update data is transferred to the backup storage system; and
 the management server obtains a used capacity of the differential data area of each of the primary storage systems, determines a time elapsed until the differential data area of the primary storage system becomes full based on the obtained used capacity, and transmits, to the router, an instruction to allocate a narrow bandwidth of the broadband IP network to the one of the primary storage systems in which the time elapsed until the differential data area becomes full is long and allocate a wide bandwidth of the broadband IP network to the one of the primary storage systems in which the time elapsed until the differential data area becomes full is short,
 wherein the management computer:
 determines the used capacity of the differential data area of each of the first storage systems; and
 transmits, to the network routing device, an instruction to allocate a wide bandwidth of the network to the one of the first storage systems in which the used capacity is high and allocate a narrow bandwidth of the network to the one of the first storage systems in which the used capacity is low.

* * * * *